United States Patent [19]

Bassetti, Jr. et al.

[11] Patent Number: 5,185,602

[45] Date of Patent: Feb. 9, 1993

[54] METHOD AND APPARATUS FOR PRODUCING PERCEPTION OF HIGH QUALITY GRAYSCALE SHADING ON DIGITALLY COMMANDED DISPLAYS

[75] Inventors: Chester F. Bassetti, Jr., Cupertino; Dayakar C. Reddy; Ekaputra Laiman, both of Milpitas; Bryan M. Richter, Saratoga, all of Calif.

[73] Assignee: Cirrus Logic, Inc., Fremont, Calif.

[21] Appl. No.: 335,622

[22] Filed: Apr. 10, 1989

[51] Int. Cl.⁵ ............................................. G09G 3/20
[52] U.S. Cl. .................................. 340/793; 340/703; 340/784
[58] Field of Search ............... 340/703, 767, 781, 784, 340/793; 358/457, 458

[56] References Cited

U.S. PATENT DOCUMENTS

| | | | |
|---|---|---|---|
| 3,735,182 | 5/1973 | Dalton et al. | 313/188 |
| 3,937,878 | 2/1976 | Judice | 340/767 |
| 4,100,579 | 7/1978 | Ernstoff | 358/230 |
| 4,385,293 | 5/1983 | Wisnieff | 340/793 |
| 4,427,978 | 1/1984 | Williams | 340/784 |
| 4,486,785 | 12/1984 | Lasher et al. | 358/284 |
| 4,591,848 | 5/1986 | Morozumi | 340/784 |
| 4,640,582 | 2/1987 | Oguchi et al. | 350/333 |
| 4,654,721 | 3/1987 | Goertzel et al. | 358/283 |
| 4,660,030 | 4/1987 | Maezawa | 340/784 |
| 4,695,884 | 9/1987 | Anastassiou et al. | 358/163 |
| 4,706,077 | 11/1987 | Roberts et al. | 340/793 |
| 4,709,995 | 12/1987 | Kuribayashi et al. | 340/793 |
| 4,742,346 | 5/1988 | Gillette et al. | 340/793 |
| 4,743,096 | 5/1988 | Wakai et al. | 350/333 |
| 4,769,713 | 9/1988 | Yasui | 340/793 |
| 4,775,891 | 10/1988 | Aoki et al. | 358/160 |
| 4,779,083 | 10/1988 | Ishii et al. | 340/767 |
| 4,791,417 | 12/1988 | Bobak | 340/784 |
| 4,805,994 | 2/1989 | Miyajima | 350/336 |
| 4,827,255 | 5/1989 | Ishii | 340/793 |
| 4,840,460 | 6/1989 | Bernot et al. | 350/333 |
| 4,860,246 | 8/1989 | Inoue | 364/900 |
| 4,872,059 | 10/1989 | Shinabe | 358/241 |
| 4,908,613 | 3/1990 | Green | 340/719 |
| 4,921,334 | 5/1990 | Akodes | 350/333 |
| 4,929,058 | 5/1990 | Numao | 350/333 |
| 4,956,638 | 9/1990 | Larky et al. | 340/793 |

FOREIGN PATENT DOCUMENTS

| | | |
|---|---|---|
| 271960 | 6/1988 | European Pat. Off. |
| 036407A2 | 4/1990 | European Pat. Off. |
| 58-220181 | 12/1983 | Japan |
| 58-220182 | 12/1983 | Japan |
| 58-220183 | 12/1983 | Japan |
| 2204174 | 11/1988 | United Kingdom |

OTHER PUBLICATIONS

"New Technologies Sharpen Laptop Displays", International Electronic Design, Feb. 1989, pp. 45–48.

Maltese, P., et al., "Addressing cycles for fast settling grey shades in ferroelectric liquid crystal matrices", 1988, Ferroelectrics, vol. 85, pp. 653–662.

Witten, I., et al., "Using Peano Curves for Bilevel Display of Continuous-Tone Images", May 1982, IEEE Computer Graphics and Applications vol. 2, No. 3, pp. 47–48.

*Primary Examiner*—Jeffery A. Brier
*Attorney, Agent, or Firm*—Limbach, Limbach & Sutton

[57] ABSTRACT

The perception of grayscale shading on a digitally commanded display is produced by commanding pixels of the display with brightness-setting signals of differing average duty cycles. Brightness-setting signals having one brightness level associated with them are phase shifted in relation to time and distributed to spaced apart pixel locations at which the one brightness level is to be produced. The energization of spatially adjacent pixels is scattered in time and pixels which are energized at the same time are selected to be spatially scattered so as to avoid the perception of visual disturbances such as flickering and surface streaming.

45 Claims, 21 Drawing Sheets

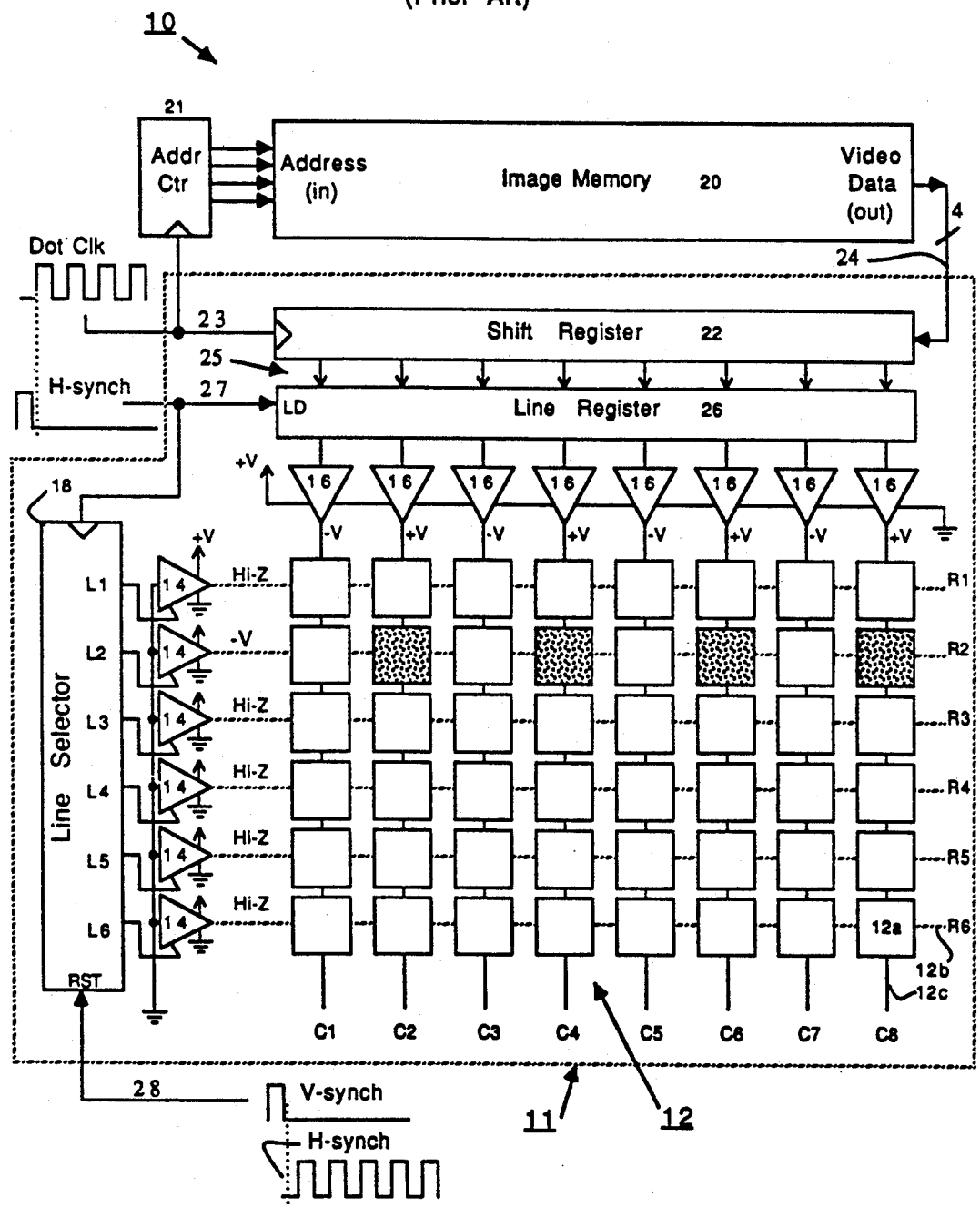

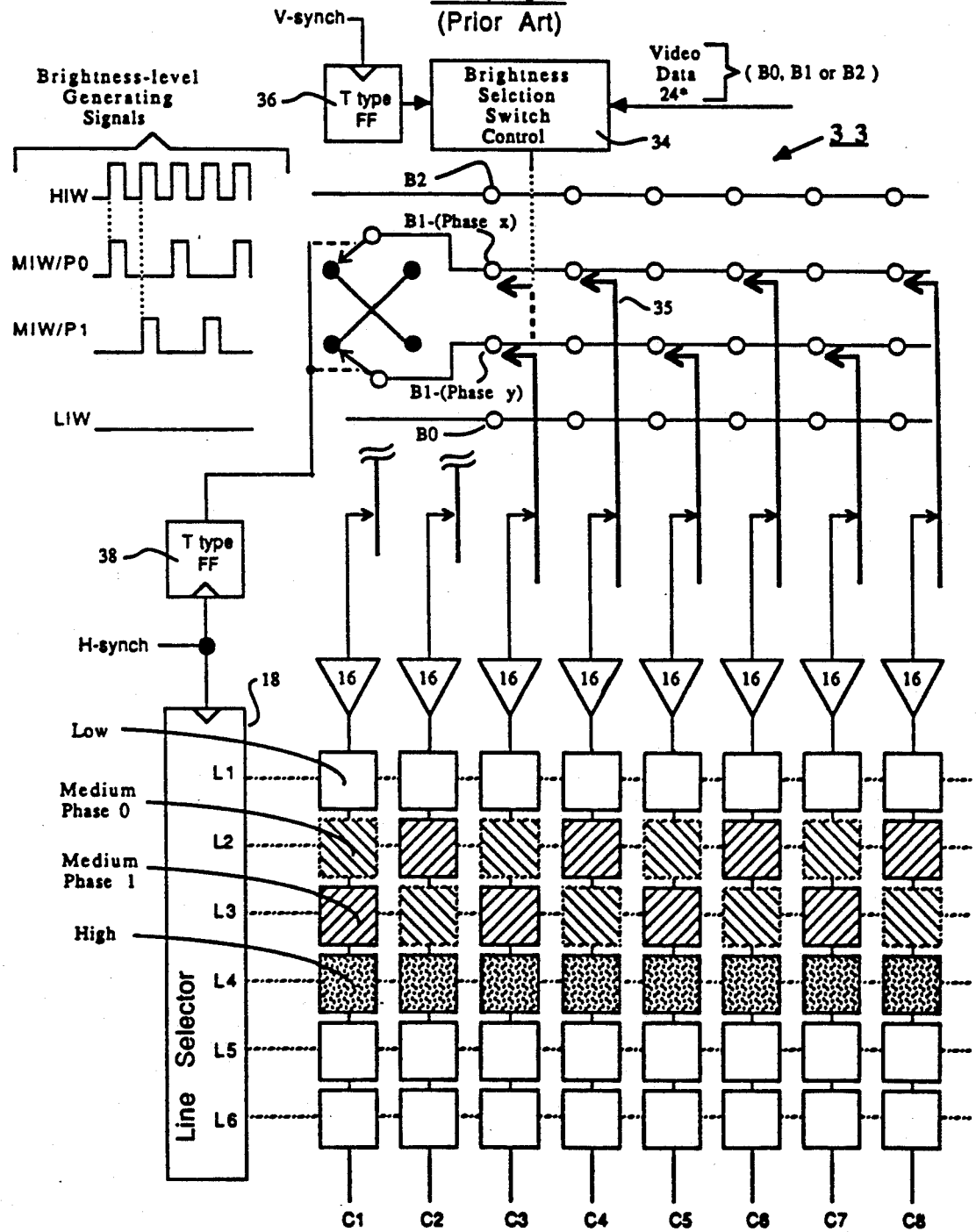

|  | 00 | 01 | 02 | 03 | 04 | 05 | 06 | 07 | 08 | 09 | 10 | 11 | 12 | 13 | 14 | 15 | 16 |
|---|---|---|---|---|---|---|---|---|---|---|---|---|---|---|---|---|---|
| 00 | 0 | 7 | 14 | 4 | 11 | 1 | 8 | 15 | 5 | 12 | 2 | 9 | 16 | 6 | 13 | 3 | 10 |
| 01 | 6 | 13 | 3 | 10 | 0 | 7 | 14 | 4 | 11 | 1 | 8 | 15 | 5 | 12 | 2 | 9 | 16 |
| 02 | 12 | 2 | 9 | 16 | 6 | 13 | 3 | 10 | 0 | 7 | 14 | 4 | 11 | 1 | 8 | 15 | 5 |
| 03 | 1 | 8 | 15 | 5 | 12 | 2 | 9 | 16 | 6 | 13 | 3 | 10 | 0 | 7 | 14 | 4 | 11 |
| 04 | 7 | 14 | 4 | 11 | 1 | 8 | 15 | 5 | 12 | 2 | 9 | 16 | 6 | 13 | 3 | 10 | 0 |
| 05 | 13 | 3 | 10 | 0 | 7 | 14 | 4 | 11 | 1 | 8 | 15 | 5 | 12 | 2 | 9 | 16 | 6 |
| 06 | 2 | 9 | 16 | 6 | 13 | 3 | 10 | 0 | 7 | 14 | 4 | 11 | 1 | 8 | 15 | 5 | 12 |
| 07 | 8 | 15 | 5 | 12 | 2 | 9 | 16 | 6 | 13 | 3 | 10 | 0 | 7 | 14 | 4 | 11 | 1 |
| 08 | 14 | 4 | 11 | 1 | 8 | 15 | 5 | 12 | 2 | 9 | 16 | 6 | 13 | 3 | 10 | 0 | 7 |
| 09 | 3 | 10 | 0 | 7 | 14 | 4 | 11 | 1 | 8 | 15 | 5 | 12 | 2 | 9 | 16 | 6 | 13 |
| 10 | 9 | 16 | 6 | 13 | 3 | 10 | 0 | 7 | 14 | 4 | 11 | 1 | 8 | 15 | 5 | 12 | 2 |
| 11 | 15 | 5 | 12 | 2 | 9 | 16 | 6 | 13 | 3 | 10 | 0 | 7 | 14 | 4 | 11 | 1 | 8 |
| 12 | 4 | 11 | 1 | 8 | 15 | 5 | 12 | 2 | 9 | 16 | 6 | 13 | 3 | 10 | 0 | 7 | 14 |
| 13 | 10 | 0 | 7 | 14 | 4 | 11 | 1 | 8 | 15 | 5 | 12 | 2 | 9 | 16 | 6 | 13 | 3 |
| 14 | 16 | 6 | 13 | 3 | 10 | 0 | 7 | 14 | 4 | 11 | 1 | 8 | 15 | 5 | 12 | 2 | 9 |
| 15 | 5 | 12 | 2 | 9 | 16 | 6 | 13 | 3 | 10 | 0 | 7 | 14 | 4 | 11 | 1 | 8 | 15 |
| 16 | 11 | 1 | 8 | 15 | 5 | 12 | 2 | 9 | 16 | 6 | 13 | 3 | 10 | 0 | 7 | 14 | 4 |

Phase Number Px (rows) / Relative Column No. (columns) / Relative Row No.

17 x 17 Placement Pattern

77

| 0 | 7 | 14 | 4 | 11 | 1 | 8 | 15 | 5 | 12 | 2 | 9 | 16 | 6 | 13 | 3 | 10 |

Wraparound Array

FIG. 7D

| Phase Number Px | 00 | 01 | 02 | 03 | 04 | 05 | 06 | 07 | 08 | 09 | 10 | 11 | 12 | 13 | 14 | 15 | 16 | Relative Column No. |
|---|---|---|---|---|---|---|---|---|---|---|---|---|---|---|---|---|---|---|
| 00 | ⓪ | 14 | 11 | 8 | 5 | 2 | 16 | 13 | 10 | 7 | 4 | 1 | 15 | 12 | 9 | 6 | 3 | |
| 01 | 12 | 9 | 6 | 3 | ⓪ | 14 | 11 | 8 | 5 | 2 | 16 | 13 | 10 | 7 | 4 | 1 | 15 | |
| 02 | 7 | 4 | 1 | 15 | 12 | 9 | 6 | 3 | ⓪ | 14 | 11 | 8 | 5 | 2 | 16 | 13 | 10 | |
| 03 | 2 | 16 | 13 | 10 | 7 | 4 | 1 | 15 | 12 | 9 | 6 | 3 | ⓪ | 14 | 11 | 8 | 5 | |
| 04 | 14 | 11 | 8 | 5 | 2 | 16 | 13 | 10 | 7 | 4 | 1 | 15 | 12 | 9 | 6 | 3 | ⓪ | |
| 05 | 9 | 6 | 3 | ⓪ | 14 | 11 | 8 | 5 | 2 | 16 | 13 | 10 | 7 | 4 | 1 | 15 | 12 | |
| 06 | 4 | 1 | 15 | 12 | 9 | 6 | 3 | ⓪ | 14 | 11 | 8 | 5 | 2 | 16 | 13 | 10 | 7 | |
| 07 | 16 | 13 | 10 | 7 | 4 | 1 | 15 | 12 | 9 | 6 | 3 | ⓪ | 14 | 11 | 8 | 5 | 2 | |
| 08 | 11 | 8 | 5 | 2 | 16 | 13 | 10 | 7 | 4 | 1 | 15 | 12 | 9 | 6 | 3 | ⓪ | 14 | |
| 09 | 6 | 3 | ⓪ | 14 | 11 | 8 | 5 | 2 | 16 | 13 | 10 | 7 | 4 | 1 | 15 | 12 | 9 | |
| 10 | 1 | 15 | 12 | 9 | 6 | 3 | ⓪ | 14 | 11 | 8 | 5 | 2 | 16 | 13 | 10 | 7 | 4 | |
| 11 | 13 | 10 | 7 | 4 | 1 | 15 | 12 | 9 | 6 | 3 | ⓪ | 14 | 11 | 8 | 5 | 2 | 16 | |
| 12 | 8 | 5 | 2 | 16 | 13 | 10 | 7 | 4 | 1 | 15 | 12 | 9 | 6 | 3 | ⓪ | 14 | 11 | |
| 13 | 3 | ⓪ | 14 | 11 | 8 | 5 | 2 | 16 | 13 | 10 | 7 | 4 | 1 | 15 | 12 | 9 | 6 | |
| 14 | 15 | 12 | 9 | 6 | 3 | ⓪ | 14 | 11 | 8 | 5 | 2 | 16 | 13 | 10 | 7 | 4 | 1 | |
| 15 | 10 | 7 | 4 | 1 | 15 | 12 | 9 | 6 | 3 | ⓪ | 14 | 11 | 8 | 5 | 2 | 16 | 13 | |
| 16 | 5 | 2 | 16 | 13 | 10 | 7 | 4 | 1 | 15 | 12 | 9 | 6 | 3 | ⓪ | 14 | 11 | 8 | |

Relative Row No.

17 x 17 Placement Pattern

77

| 0 | 14 | 11 | 8 | 5 | 2 | 16 | 13 | 10 | 7 | 4 | 1 | 15 | 12 | 9 | 6 | 3 |
|---|---|---|---|---|---|---|---|---|---|---|---|---|---|---|---|---|

Wraparound Array 5,185,602

METHOD AND APPARATUS FOR PRODUCING PERCEPTION OF HIGH QUALITY GRAYSCALE SHADING ON DIGITALLY COMMANDED DISPLAYS

BACKGROUND OF THE INVENTION

1. Field of the Invention

The present invention is directed to a method and apparatus for producing the perception of grayscale shading on digitally controlled displays. The invention is more specifically directed to a method and apparatus for generating the perception of many different brightness levels by digitally commanding the pixels of multiplexed liquid crystal displays towards either full brightness or complete darkness at appropriate times.

2. Description of the Prior Art

Grayscale shading can be generated on the screen of a conventional cathode ray tube (CRT) by varying an analog brightness control voltage at the grid electrode of the tube while an electron beam of the CRT is swept across different pixel positions of a display line. The same grayscale shading technique does not lend itself to digitally commanded displays such as multiplexed liquid crystal displays (LCD's), light emitting diode (LED) displays or plasma displays wherein individual pixels (discrete light source regions including emissive, transmissive and reflective types) can be commanded to switch towards only one of two brightness levels, ON or OFF (i.e., white or black). Such digital displays generally lack an analog control electrode equivalent to the grid electrode of a CRT and thus they do not have a direct means independent of their power lines for commanding a pixel towards an intermediate brightness level between black and white.

Multiplexed displays typically have only two electrodes provided at each pixel area for addressing a pixel area and energizing the pixel area to either produce the appearance of a fully lit (white) pixel or to produce the appearance of a fully darkened (black) pixel. Since an analog means for controlling brightness level is not available on many types of digital displays including raster-scan multiplexed displays, alternative digital techniques have been proposed for giving a viewer the perception of grayscale shading.

One of the proposed alternative techniques is a so-called "pulse-width modulation" scheme wherein the width of pixel energizing pulses is modulated between wide and narrow values to create a grayscale effect. Another technique is a so-called "frame-rate duty cycle modulation" scheme wherein the duration between energizing pulses of fixed width is varied between long and short to create a grayscale effect. A third proposed approach is to switch from the use of "time multiplexed" digital displays (which are commonly employed in laptop computers) to so-called "active matrix" display panels, the latter panels being ones which have active pixel-driving electronics defined at the location of each pixel, and to form a three-terminal analog-controllable display element out of such an active-matrix topology for continuously energizing each pixel discretely to a desired level of brightness.

While all the proposed grayscaling methods appear promising, each has its unique problems. Active matrix displays are still at an early stage of development. Techniques for increasing mass production yields and reducing manufacturing cost have not yet been refined. The idea of using an analog control scheme for creating the perception of grayscale shading discretely at each pixel does not conform with a general desire in the industry to have digital, time-multiplexed means rather than time-continuous analog circuits for controlling a display.

Conventional displays, such as raster-scan multiplexed LCD or electro-luminescent (EL) displays used in low-power laptop computers, are designed around the presumption that a pixel will be commanded to be either fully lit or unlit by a control pulse of a fixed duration (pulse width) which is associated with a binary logic bit (command bit). This presumption of a fixed-width command pulse conflicts not only with the basic requirements of the analog-controlled active matrix approach but also with the basic requirements of the pulse-width modulation approach. If the pulse-width modulation scheme is adopted, substantial redesign of already available display-driving electronics may be required to produce pixel energizing pulses of variable width and the cost of such new electronics may be significantly higher than that of the already-available drive electronics. Additionally, undesirable crosstalk between densely packed circuits may be created by employing the pulse-width modulation scheme since a high frequency harmonic content is typically associated with the relatively narrow pulses that might be produced by the latter technique. Because changes to the already proven technology of conventional panel-driving electronics are generally undesirable, the pulse-width modulation scheme is not presently acceptable within the industry.

The frame-rate duty cycle modulation method appears to be more acceptable to the industry at the current time, but this latter method is not without problems. Display elements based on light emitting diode (LED), liquid crystal (LCD), electro-luminescent (EL), plasma or other technologies typically require periodic application of refresh energy in order to retain their appearance of being lit or unlit (bright or dark). The frame-rate duty cycle modulation technique operates by extending the time between pixel energizing pulses. If the duration between energizing pulses is reduced substantially below a brightness integrating period associated with the human eye (i.e., substantially below one sixtieth of a second) in order to create a grayscale effect, a noticeable and undesirable perception of flickering within the display image may be created, particularly when a large number of pixels are being simultaneously commanded towards one of the ON and OFF states.

The use of alternate (interlaced) phasing has been proposed to overcome the flickering problem. The human eye has a tendency to integrate over space as well as over time. When adjacent pixels are operated in a grayscale mode by energizing them, for example, once every one thirtieth of a second instead of once every one sixtieth of a second as would be done for fully lit pixels, it is possible to suppress the perception of flickering by providing the lower frequency (30 Hz) waveform as two distinct signals, 180 degrees out of phase from each other, and applying the two signals respectively to adjacent pixels (adjacent in the vertical and horizontal directions) so that the overall refresh frequency for every pair of adjacent pixels still appears to be the higher 6̂ Hz rate rather than the more noticeable 30 Hz rate to the human eye.

Unfortunately, when the interlaced phasing method is attempted for producing more than three levels of brightness, without further refinement, other visual disturbances tend to appear. Long, continuous lines of pixels that are alternately turned on and off, approximately 120 or less degrees out of phase from adjacent lines tend to produce a so-called "movie marquee" effect wherein it appears that the surface of a grayscale shaded area is streaming either to the left, to the right, diagonally or in circles. This appearance of a streaming motion (movie marquee effect) can be distracting to the eye and is therefore undesirable. Image jitter and transitory spots arising from crosstalk, noise, etc can also create problems and give the viewer an undesirable perception of a fuzzy rather than crisp, focused image. Heretofore, an effective method for simultaneously avoiding multiple visual disturbances such as the flickering effect and the movie marquee effect has not been shown.

SUMMARY OF THE INVENTION

It is an object of the present invention to provide a method and apparatus for creating the perception of grayscale shading in digitally controlled displays while substantially avoiding the above-mentioned visual disturbances. It is a further object of the invention to provide a method and apparatus for creating a grayscale effect which is capable of at least six distinguishable levels of brightness and more preferably, of at least sixteen such brightness levels and even more preferably, of thirty-two levels. It is yet another object of the present invention to provide a grayscale shading method which is compatible with video images that are occasionally subjected to a reverse-video command, wherein black regions are to be displayed as white, white regions are to be displayed as black, and relatively dark and light grayscaled areas are to be respectively and reversibly displayed as relatively light and dark grayscale areas.

It is to be understood that the term "grayscale" is intended to be applied here to not only monochromatic displays but also to color displays wherein the brightness (occularly perceived luminance) of a colored region is to be varied across a predetermined intensity range. The invention is not limited to any one display technology and should be applicable to all types of displays wherein pixels are discretely commanded towards one or the other of a bright and dark level.

In accordance with a first aspect of the invention, grayscaling is effected by providing at least six different waveforms (brightness-setting waveforms), each having at least five ON/OFF command bits which are sequentially produced over a predetermined phase-scattering period. The phase-scattering period is preferably selected to be equal to D times a predetermined frame period, where D is an integer associated with a D-by-D square phase-placement pattern (matrix). The side dimension D of the phase-placement pattern is preferably selected to enable tiling of a plane with irregular rectangles of dimensions a-by-b, where a is not equal to b, while simultaneously filling the plane with a checkerboard pattern formed of D-by-D squares. The side dimension D may be selected in accordance with the constraint $D = a^2 + b^2$ where D is not evenly divisible by either a or b and where a, b and D are integers greater than zero. Pixel energizing commands which are to occur during a common time span (i.e., frame period) are preferably positioned at opposed diagonal corners of the rectangles to maximize distance between simultaneously energized pixel locations and to spread the load on column and row drivers which are energizing the pixel locations.

The at least six brightness-setting waveforms may be used for not only commanding display pixels to appear either fully ON or OFF (white or black) but also for creating the perception of intermediate brightness levels distributed across the range between full ON or OFF. The first of the six digital waveforms has a first average duty cycle (averaged over the predetermined phase-scattering period) which is associated with a maximum brightness level. The sixth digital waveform has a corresponding sixth average duty cycle (taken over the predetermined phase-scattering period) which is associated with a minimum brightness level. The second through fifth digital waveforms respectively have second through fifth, different average duty cycles (again taken over the predetermined phase-scattering period) which are preferably associated with different levels of apparent brightness spaced in a generally periodic manner (approximately equally spaced) between the maximum and minimum brightness levels. The ON command bits of any one brightness-setting waveform are preferably equally spaced apart from each other over time and the OFF command bits of each waveform are likewise preferably spaced equally apart from one another over time so that low frequency components of each waveform are suppressed relative to high frequency components of the same waveform.

The first and sixth digital waveforms (brightness-setting waveforms) are preferably paired to have ON/OFF command bits which are binary complements of one another so that the command bits of the sixth digital waveform may be produced by performing a sequential binary NOT operation on the ON/OFF command bits of the first digital waveform. Likewise, the second and fifth digital waveforms are preferably paired to be binary complements of one another so that the fifth digital waveform may be produced by performing a binary NOT operation on the bits of the second digital waveform. The third and fourth digital waveforms are also preferably paired as binary complements of each other. This preferred use of binary complementable waveforms will be referred to later within the specification as "grayscale mirroring". In accordance with a preferred embodiment of the invention, digital information representing approximately half of the six or more digital waveforms is stored in a memory device (i.e. a waveform ROM) and the complementary others of the six or more digital waveforms are not represented by stored data but rather reproduced by performing a binary NOT operation on the data of the stored waveforms.

In accordance with a further aspect of the invention, phase-shifted versions of at least one of the second and fifth digital waveforms are applied to adjacent pixel areas of a matrixed display at different times (i.e., in different display "frames"). Phase selection is determined in accordance with both the row and column numbers which designate the location in the matrix of the pixel that is to be driven by the at least one waveform. Preferably, a predetermined phase selection array is stored in memory and phase selection values are dynamically read from memory as a display is being scanned to determine which of the ON/OFF command bits of a preselected brightness-setting waveform is to be transmitted to a pixel in a specific row and column during a particular frame cycle. In accordance with a preferred embodiment of the invention, the output loadings on row and column drivers of a multiplexed display panel are balanced by distributing the phases of at least one of the digital waveforms in accordance with a square phase-placement pattern. This latter concept will also be referred to later in the specification as "balanced loading". It may be preferable to choose this placement pattern of dimensions D×D where D is equal to the sum of two squared integers a and b, where neither a nor b divide D evenly (i.e. D=2, 5, 10, 13, 17, 25, 26, 29 . . .). In accordance with yet another aspect of the invention, the number of distinguishable brightness levels to be displayed (which is the same as the number of utilized brightness-setting waveforms) is preferably chosen to be less than the side dimension D of the D×D placement pattern even though the D×D pattern can support D+1 or more brightness levels (i.e., only 16 levels are chosen for a 17×17 phase-placement pattern capable of supporting as many as 18 levels).

In accordance with yet a further aspect of the invention, one of a plurality of predetermined phase-placement patterns is dynamically selected depending on the state of previously displayed pixels.

In accordance with another aspect of the invention, 2×2 stippling patterns, each having four pixels with pairs thereof operating at two different brightness levels other than black or white, are formed to create the perception of grayscale levels between those realizable by the individual pixels alone. The left to right ordering of the different brightness levels is preferably alternated in adjacent horizontal lines of the display to prevent the formation of vertical gray streaks. Other aspects of the invention will become apparent from the below detailed description of the preferred embodiments.

BRIEF DESCRIPTION OF THE DRAWINGS

FIG. 1A is a block diagram showing the structure of a conventional digital display.

FIG. 3A is a schematic diagram of a previously proposed apparatus for creating a three level brightness effect in a liquid crystal display panel.

FIG. 6C illustrates a fill pattern for the 5×5 phase-placement matrix of FIG. 6A.

FIG. 7C illustrates a first ordering of phases within the 17×17 phase-placement pattern.

FIG. 7D illustrates a second ordering of phases within the 17×17 phase placement pattern.

DETAILED DESCRIPTION OF THE PREFERRED EMBODIMENTS

The following is a detailed description of the best modes presently contemplated for practicing the invention. This description is intended to be merely illustrative of the principles of the invention and should not be taken in a limiting sense.

Figure 1B:
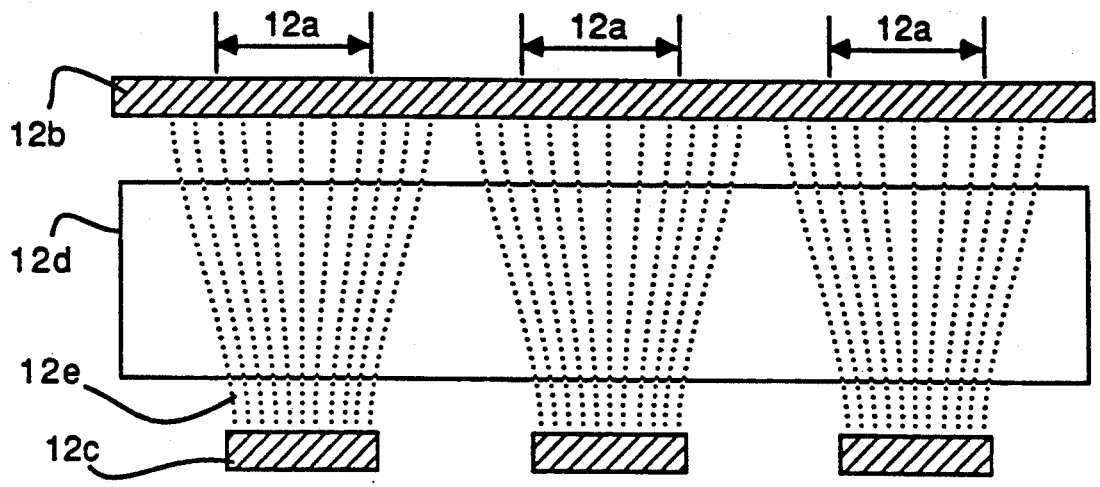
FIG. 1B is a cross-sectional view of a liquid crystal display panel.

FIG. 1 is a block diagram of a conventional digitally controlled display system 10. The display system 10 comprises a raster-scan compatible type of multiplexed liquid crystal (LCD) panel unit 11 in which there is provided a two-dimensional matrix 12 of pixel regions 12a, each of which is uniquely addressable by orthogonal row and column electrodes, 12b and 12c. Typically, the row and column electrodes 12b and 12c, are respectively placed as densely packed parallel conductors on the top and bottom surfaces of a display panel (not shown) with a preselected liquid crystal material 12d (FIG. 1B) being sandwiched between the top and bottom electrodes, 12b and 12c. The top electrodes (i.e., 12b) and top portion of the display panel (not shown) are preferably made of transparent layers. An electric field 12e (FIG. 1B) is applied to the liquid crystal material 12d of a p⁻ selected pixel area 12a (FIG. 1A) by activating a preselected one of a plurality of line drivers 14 coupled to the row electrodes 12b and simultaneously activating one or more of a plurality of column drivers 16 coupled to the column electrodes 12c. Positive and negative (ground) power terminals of the row and column drivers, 14 and 16, are usually connected to common high and low voltage rails (+V and −V). Charge flow between the output terminals of a selected row driver 14 and an activated column driver 16 establishes a desired electrical field 12e through the liquid crystal material 12d of an addressed pixel area 12a and the field changes the orientation of molecules in the liquid crystal material 12d thereby causing the pixel area 12a to appear as either a dark or bright area.

A composite image may be formed by sequentially activating the rows (i.e., R1–R6 of FIG. 1) of the display matrix 12 one row at a time in time multiplexed fashion and transmitting binary video data to the pixel areas 12a of the selected row (Rx) through the column drivers 16. As shown in FIG. 1, the column drivers 16 receive binary video data in prestored parallel fashion from a line register 26. The binary video data originates in an image memory 20 which is addressed by a synchronous address counter 21. The address counter 21 is clocked by a high frequency dot clock (pixel clock) 23. Video data is output from the image memory 20 along a four-bit wide serial bus 24 to a shift register 22 also clocked by the dot clock 23. The shift register 22 transforms the 4-bit wide serial data stream 24 of video bit data into a wider parallel data format 25 and this parallel data 25 is loaded into the line register 26 when the latter register 26 is strobed by a horizontal synchronization pulse (line clock) 27. The horizontal synchronization pulse 27 also clocks a one-of-N line selector 18 which activates a desired one of the plural row drivers 14 to place a low potential (−V) on its corresponding row electrode 12b. A vertical sync pulse (frame start pulse) 28 is applied to a reset terminal of the line selector 18 at the end of each display frame in order to restart the row scanning from the top line (R1) of the display matrix 12 towards a preselected bottom line (R6).

Typically, the display matrix 12 is organized as a unit (display segment) of 480 to 640 columns by 200 to 240 rows and all the rows are scanned at a rate of approximately 50 to 120 Hz (usually V-synch pulses 28 are generated sixty times a second). The H-synch clock 27 typically operates at 10 KHz to 30 KHz and the dot clock 23 operates at roughly 6 MHz. When more than 240 rows are desired in a display, display segments are stacked one on top of another and each display segment is refreshed at a frame rate of approximately 50 to 120 Hz.

Referring to FIG. 1B, which shows a cross-sectional view of a liquid crystal display panel, it can be seen that the electric field 12e emanating from plural column electrodes 12c tends to enlarge in width as it extends to the orthogonal row electrode 12b to the orthogonal row electrode 12b above the plural column electrodes 12c. In high density displays, it is possible for the electric field 12e of a first turned on column electrode 12c to encroach on an adjacent region of liquid crystal material 12d which is to be controlled by an adjacent column electrode 12c.

Figure 1C:
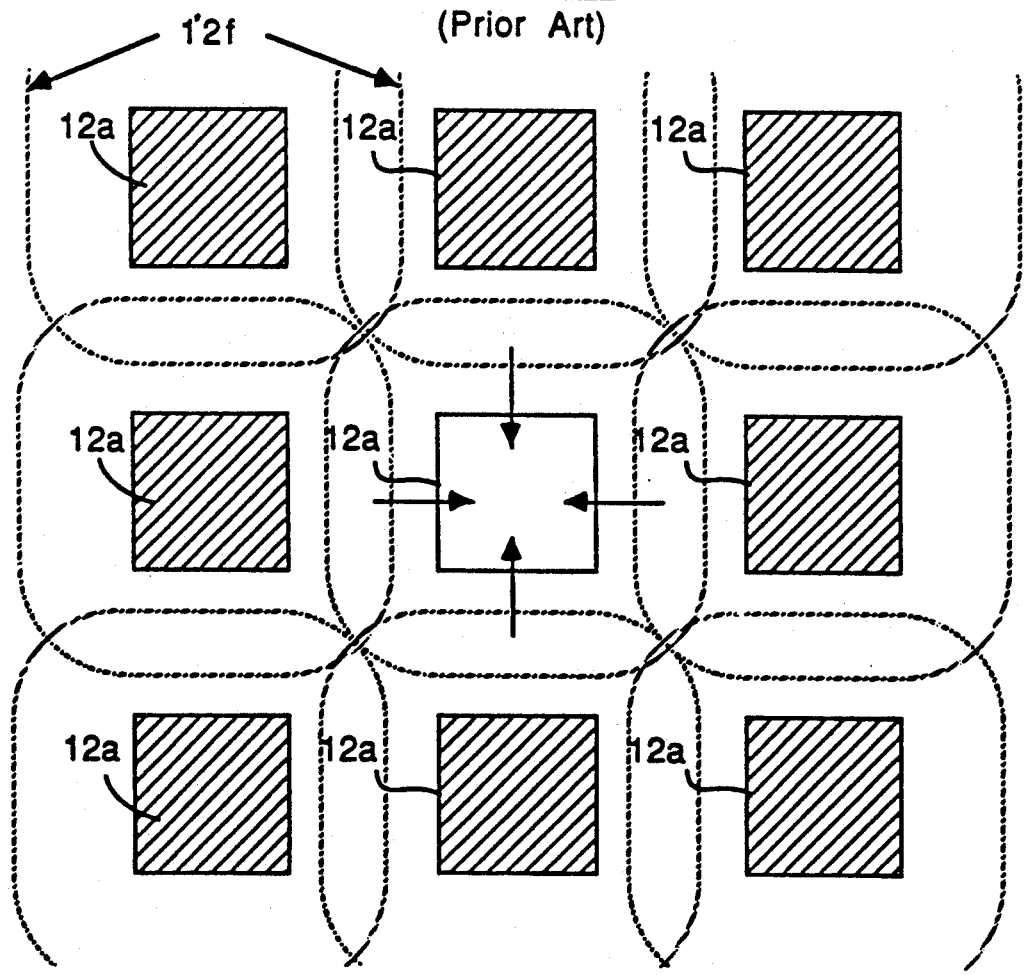
FIG. 1C is a top view of the panel shown in FIG. 1B for explaining electrical and visual crosstalk between adjacent pixels.

Referring to the top view of FIG. 1C, the possibility of overlap between electrical fields of adjacent pixel areas 12a is denoted by the overlapping boundaries of rounded rectangles 12f. The physical overlap of the top 12b and bottom 12c electrodes is denoted by the hatched square areas marked as regions 12a. A central one of the nine pixel areas 12a shown in FIG. 1C is left unhatched to show how the effective area and/or apparent brightness of an unlit pixel can be reduced by the encroachment of electrical field peripheries 12f of surrounding lit pixels.

Aside from electrical crosstalk (as indicated by overlapping field boundaries 12f), densely-packed pixel-matrices are susceptible to visual crosstalk. The human eye's perception of a point on a display surface is affected by the brightness of surrounding points. Integration occurs within the human eye such that the brightness and/or size of a single unlit pixel surrounded by adjacent lit pixels can be perceived as being substantially altered by the peripheries of the surrounding pixels. This is denoted by the four inwardly-pointing arrows of FIG. 1C. Complex varieties of both electrical and visual crosstalk may occur in a liquid crystal display depending on which pixels are commanded to be either ON or OFF at a given moment in time.

Figure 2A:
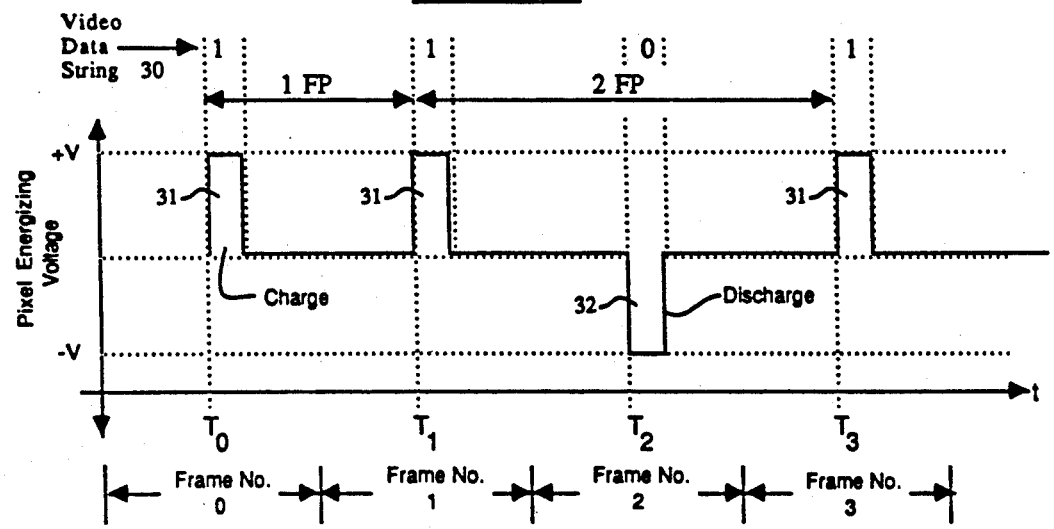
FIG. 2A shows the waveform of a frame rate duty cycle modulated waveform for controlling the apparent brightness of a pixel.

Referring to FIG. 2A, the brightness of a pixel area 12a in a liquid crystal display can be incremented to a higher brightness level by applying a plurality of charging pulses 31 across its row and column electrodes, 12b and 12c, and the brightness of the pixel area 12a can be decremented towards a lower brightness level by applying one or more discharge pulses 32 across its respective electrodes. (The polarity of the charge and discharge pulses is periodically reversed to prevent damage to the liquid crystal material.) The bits (i.e. "1101") of a video data string 30 supplied by a user determines whether a charge or discharge pulse will be applied. These bits 30 are supplied at pixel strobing times $T_0$, $T_1$, $T_2$, $T_3$, etc. occurring within respective refresh frame numbers 1, 2, 3, etc. as indicated in FIG. 2A. If combinations of charge and discharge pulses, 31 and 32, are applied to an individual pixel area 12a over a predetermined response period $P_R$ (FIG. 2B), the brightness level of the pixel area 12a will be determined by the difference in number of the charge and discharge pulses, 31 and 32, over the predetermined response period $P_R$ (FIG. 2B).

A one-time scanning of all the pixels in the display matrix 12 on a sequential line by line basis is referred to in the industry as a "frame refresh", "frame cycle", or "frame period". Typically, frames are refreshed at the rate of approximately 50 to 120 times per second (usually 60 Hz). Only one charge pulse 31 or discharge pulse 32 is applied to each individual pixel area 12a during a single frame refresh cycle (a frame period, FP). If a series of charge 31 and discharge 32 command pulses are to be applied to a single pixel area for achieving a desired level of brightness based on average duty-cycle, such a series is normally applied over the course of many frame periods (i.e., four or more frame cycles).

Figure 2B:
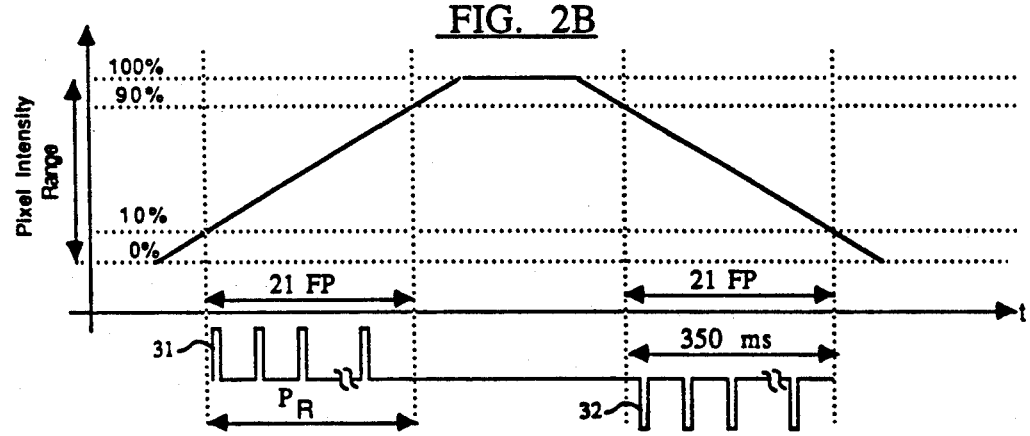
FIG. 2B is a graph illustrating the cumulative response of liquid crystal display panels over multiple frame periods.

Referring to FIG. 2B, the typical response $P_R$ time of a liquid crystal display can be on the order of 100 to 350 milliseconds (time for incrementing or decrementing the brightness of a pixel across a range between 10% and 90% of maximum brightness). A large number (i.e. 21) of frame refresh cycles may be required to raise the brightness level of a single pixel area 12a from a relatively low brightness level (i.e. 10%) to a relatively high brightness level (i.e. 90%) and to conversely decrease the brightness level over a same span. Periodic refreshing is required to retain a desired level of brightness.

Figure 2C:
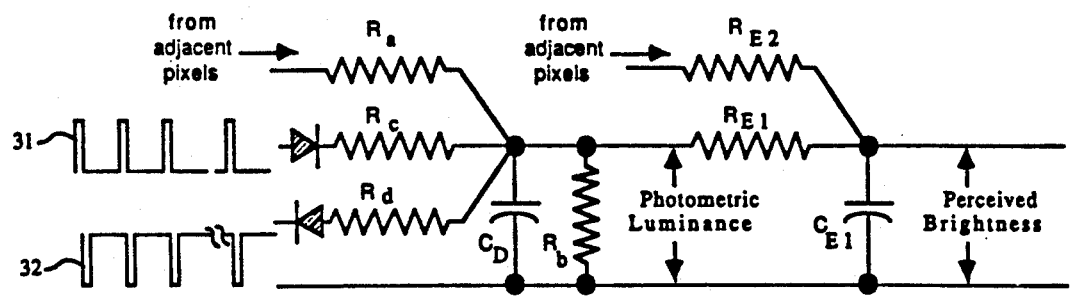
FIG. 2C is a schematic diagram of a first order model for explaining the time-space integrating behavior of adjacent liquid crystal display elements and the time-space integrating behavior of a human eye which is viewing the display elements.

Referring to FIG. 2C, there is shown a schematic diagram of a first order model for explaining the perceived behavic of adjacent pixel areas 12a in a liquid crystal display (LCD). Each pixel area may be modeled by a finite capacitor $C_D$ across which there is placed a bleed-resistor $R_b$ of relatively high resistance. The luminance (photometric) of the pixel area 12a (represented by voltage across the display capacitance $C_D$) may be incremented by transmitting charge pulses 31 through a charge resistor $R_c$ and may be decremented by applying discharge pulses 32 through a discharge resistance $R_d$. Electrical crosstalk from the fields 12f of adjacent pixels can enter the integrating function (capacitor) $C_D$ of the pixel through resistor $R_a$. The model of FIG. 2C is based on the idea that the reorientation of liquid crystal molecules occurs as a cumulative effect and that such molecules have a natural tendency to relax (discharge through bleed resistor $R_b$) into a natural state if not periodically refreshed. The level of brightness perceived by the human eye tends to be an integrated function over time of the brightness level transmitted by each individual pixel area 12a as well as an integrated function over space of light received from adjacent pixels. Accordingly, the model of FIG. 2C includes a second order integrating circuit having resistor $R_{E1}$ and capacitor $C_{E1}$ for representing the delayed cumulative response of the human eye to a first display element (pixel) and a second resistor $R_{E2}$ for representing contributions from adjacent pixels. The voltage across the eye capacitor $C_{E1}$ represents perceived brightness of the first display element.

It will be recognized that the model shown in FIG. 2C has a finite bandwidth and that a time varying voltage can appear across the eye-spot modeling capacitor $C_{E1}$ if the overall temporal frequency of the charge 31 and discharge pulses 32 drops below a predetermined level. When this happens, the eye perceives a noticeable flicker in a displayed image. This type of flickering may be observed in the horizontal scan lines of commercial television sets (having a refresh rate of approximately 50-60 Hz) if the eye is brought close to the screen. From a distance, the eye has a tendency to integrate over space as well as time. A horizontal line interlacing technique is used in conventional television sets to hide the perception of flickering.

Referring to FIG. 3A, a similar interlacing technique has been proposed for hiding the flickering effect of pixels driven at 50% of the full brightness refresh rate rather than at 100% of that refresh rate. Four waveforms, HIW, MIW/P0, MIW/P1 and LIW are shown in FIG. 3A. Waveforms MIW/P0 and MIW/P1 have equal duty cycles but are 180° out of phase from each other. Waveform HIW has a duty cycle half as long as that of waveforms MIW/P0 and MIW/P1. Accordingly, a relatively high intensity appearance will be imparted to pixels energized by waveform HIW while a lower level of average intensity will be perceived at pixels which are driven by either of the medium intensity waveforms MIW/P0 and MIW/P1. An even lower intensity will be observed at pixels which are driven by the low intensity waveform LIW which is composed of only discharge command pulses 32. It was observed that if adjacent pixels are simultaneously strobed by a 50% medium intensity waveform of only one phase, i.e., MIW/P1, that flickering can become quite noticeable; but if adjacent pixels are driven by interlaced phases of the same waveform MIW, the flickering can be suppressed.

FIG. 3A shows a schematic diagram of a previously proposed circuit 33 which includes flip-flops 36 and 38 for alternately applying 180° apart waveforms MIW/P0 and MIW/P1 to pairs of pixels which are adjacent to each other either in the row direction or the column direction. Brightness-selection switch control 34 operates switch 35 to select one of four brightness signals, B0, B1-(phase y), B1-(phase x) and B2, in response to digital video data 24* provided by a host system (not shown). The digital video data 24* provides at least four bits of data for each pixel in order to select one of a low, medium and high brightness levels.

Figure 3B:
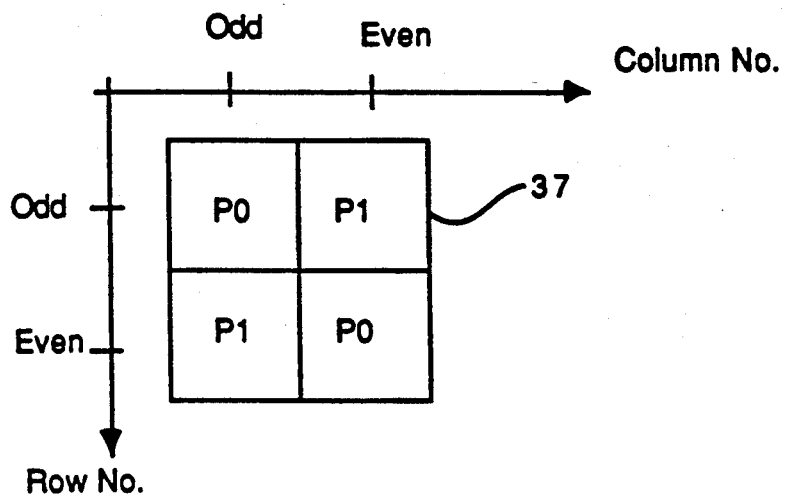
FIG. 3B illustrates an elemental 2×2 phase-placement pattern which may be associated with the embodiment shown in FIG. 3A.

Referring to FIG. 3B, there is shown an elemental phase-placement pattern 37 depicting the resulting phase distribution of the circuit 33 illustrated in FIG. 3A. Diagonally adjacent pixels receive the same phase (i.e. P0) while pixels which are adjacent to each other either horizontally or vertically receive different phases (P0 and P1).

Figure 3C:
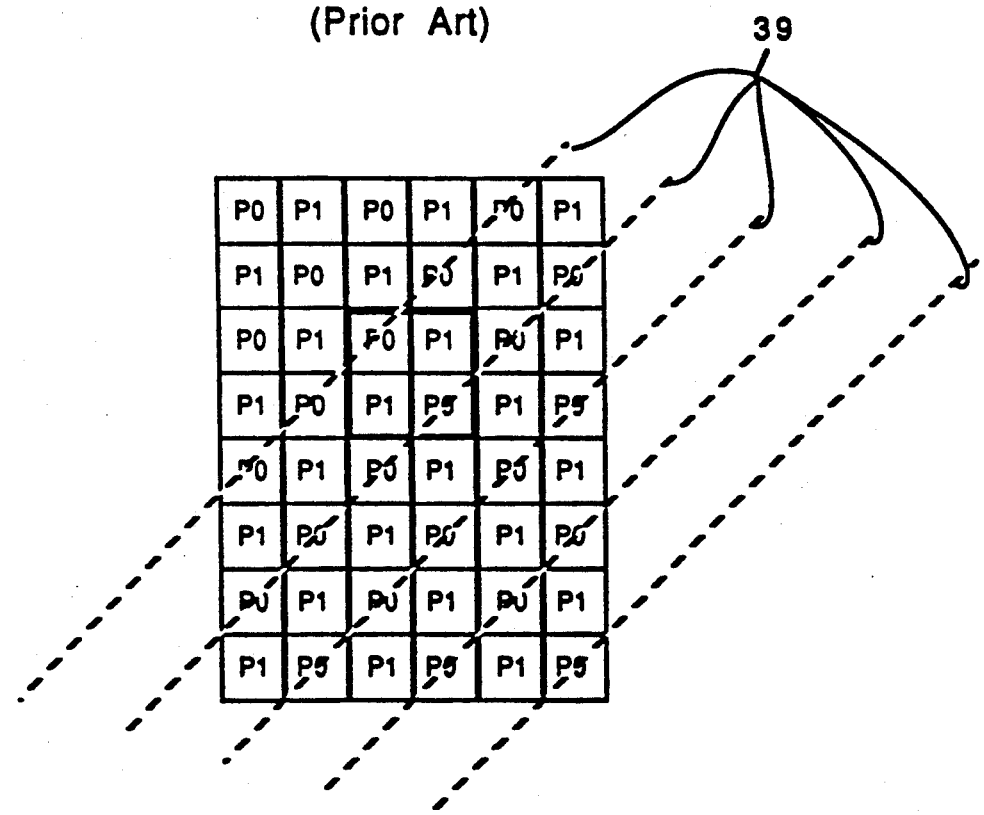
FIG. 3C illustrates a display area which is tiled by the elemental phase-placement pattern of FIG. 3B.

Referring to FIG. 3C, the energization during a single frame (i.e., phase P0) of diagonally adjacent pixels can create a fused appearance of diagonal lines 39. If the diagonal lines of phases P0 and P1 are strobed at a sufficiently high rate (i.e., 30 Hz each) the eye tends to fuse the diagonal lines 39 together so that an area of uniform brightness, between minimum and maximum brightness, is perceived.

The utility of the brightness control circuit 33 shown in FIG. 3A was found to be limited. Shaded areas whose brightness level was intended to graduate continuously from dark to light could not be easily produced. A scheme using four brightness levels, B0-B3, and a three by three (3×3) phase placement pattern was proposed to provide improved grayscaling.

Figure 4B:
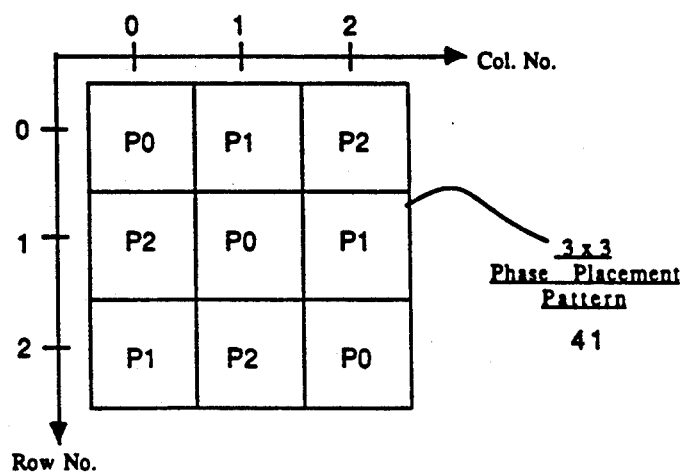
FIG. 4B illustrates a possible phase-placement pattern for the brightness-setting waveforms illustrated in FIG. 4A.
Figure 4A:
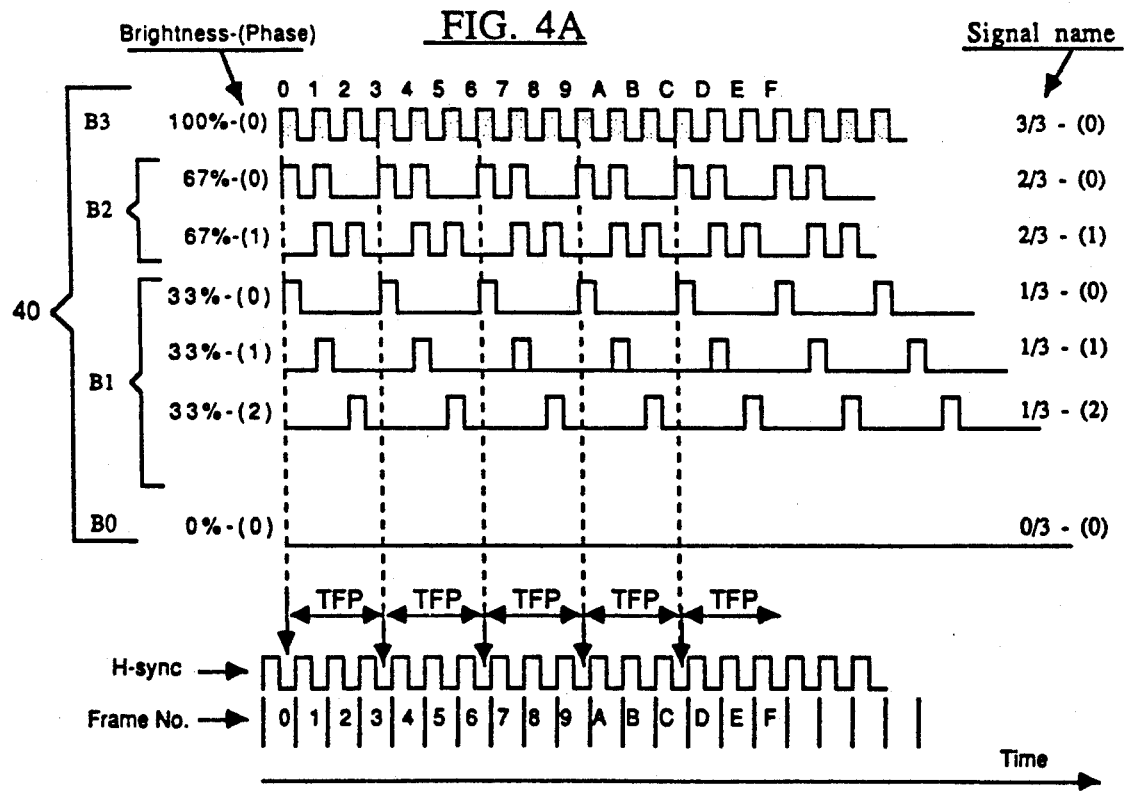
FIG. 4A illustrates a set of brightness-setting waveforms capable of producing a grayscale effect having four brightness levels.

Referring to FIG. 4A, a set of three frame periods (TFP) was periodically repeated using a first brightness-setting signal 3/3 (having three ON command bits within the three frame period TFP) for establishing a first brightness level B3. A brightness-setting signal 0/3 (having no ON command bits within the three frame period TFP) was used to establish a fourth brightness level B0 opposed to the first brightness level B3. A third brightness-setting waveform 2/3-(0) or 2/3-(1) (having two ON command bits followed by or preceded by an OFF command bit within the three frame period TFP) was used to establish a second brightness level B2. Three brightness-setting signals (designated as 1/3-(0), 1/3-(1) and 1/3-(2)) were used to establish a third brightness level B1 between the second and fourth levels, B2 and B0. As shown in FIG. 4A, the ⅓ brightness-setting signals are distributed 120 degrees apart from each other across the three frame period TFP.

Referring to FIG. 4B, there is shown a three-by-three (3×3) phase-placement pattern 41 showing how alternating pixel locations of a matrix may be assigned to receive different ones of the three brightness-setting signals, ⅓-(0), ⅓-(1) and ⅓-(2). The designation P0 indicates that a pixel at that location will receive the zero phase of the ⅓ waveform, that is, it will receive the ⅓-(0) brightness-setting signal. Likewise, pixel locations designated with the P1 notation will receive the ⅓-(1) signal and pixel locations designated with the P2 notation will receive the ⅓-(2) signal. To determine which pixel locations of a full display will receive which of the phases, P0, P1, and P2, the three by three phase-placement pattern 41 is tiled in checkerboard manner across the rows and columns of a display matrix as was done in FIG. 3C for the two by two pattern 37 of FIG. 3B.

Figure 4C:
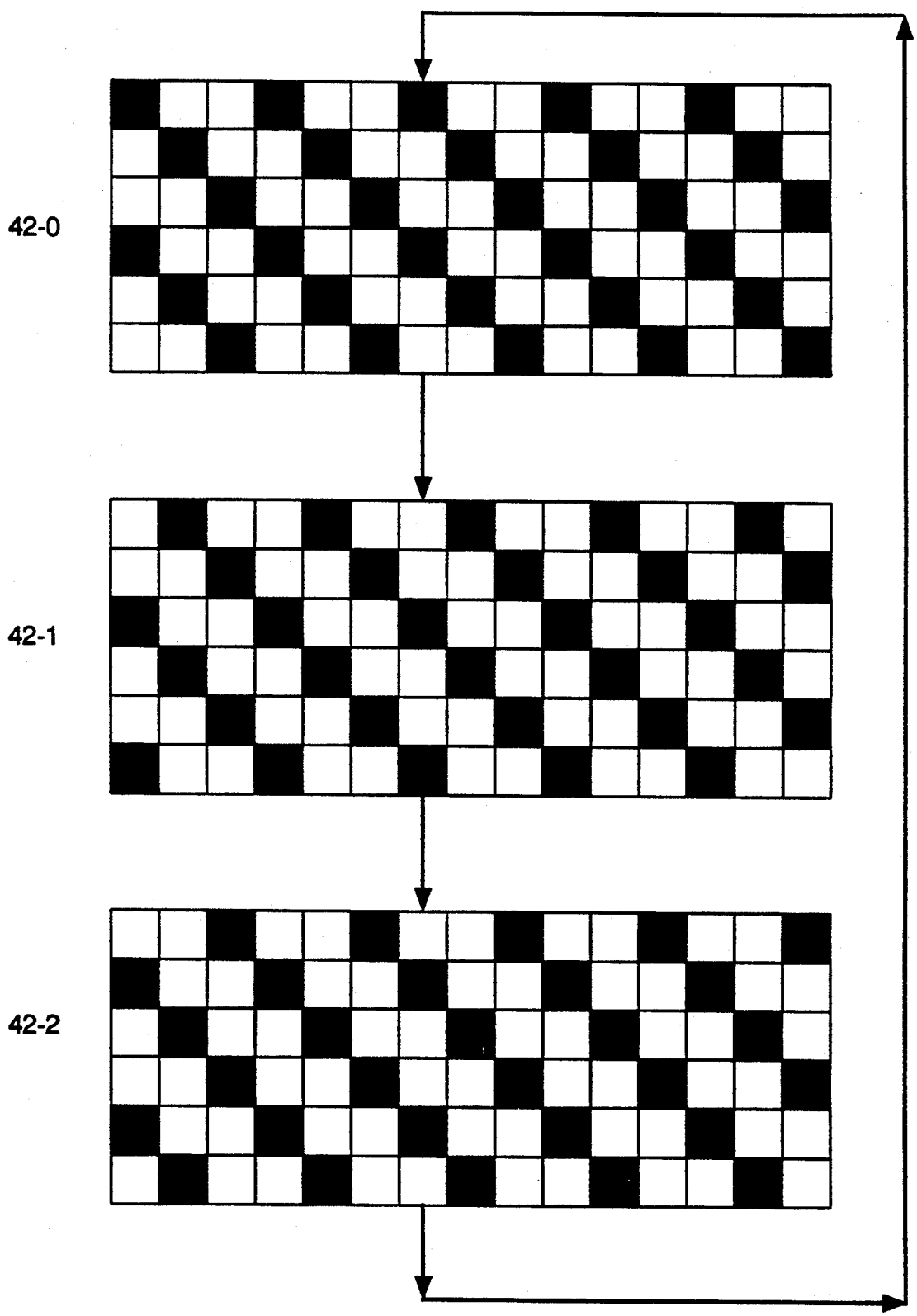
FIG. 4C illustrates how visual disturbances can be created by the phase-placement pattern of FIG. 4B.

When the phase-placement pattern 41 of FIG. 4B was tested, a significant movie marquee effect was noted. Referring to FIG. 4C, the appearance of three successive frames, 42-0, 42-1 and 42-2, is shown for the case where an entire display screen is being commanded to the B1 brightness level (FIG. 4A) using the three phase signals ⅓-(0), ⅓-(1) and ⅓-(2), and placing them in accordance with the pattern 41. As can be seen, diagonal lines spaced apart from each other horizontally by two pixel spaces are seen in each frame and the eye perceives these lines as marching from left to right when the frames are successively flashed one after the next.

It was thought that if four phases were used instead of three, and a four-by-four phase placement matrix was employed, such an arrangement could be used to break up the strong pattern of diagonal lines resulting from the three by three pattern of FIG. 4B. Referring to FIG. 4D, there is shown a set 43 of brightness setting signals (designated as 0/16-(0), 4/16-(3), 4/16-(2), . . ., 8/16-(0) and 16/16-(0)). The brightness setting signals W/16-(p) are defined in accordance with their placement along a predetermined four-frame phase-scattering period FFP (W and p are integers denoting waveform number and phase). The four-frame phase-scattering period FFP is shown repeated four times across a time period of sixteen frames (frames $O_{hex}$ through $F_{hex}$). Brightness setting signal 16/16-(0) consists of sixteen ON command bits each occurring within a preselected time slot in each of frame numbers $O_{hex}$ through $F_{hex}$. Brightness setting signal 8/16-(0) consists of sixteen bits among which eight are ON command bits and the others are OFF command bits. The ON command bits of signal 8/16-(0) are equally distributed in time and the first of the ON command bits occurs during frame number 0 thereby designating this waveform as having a zero phase number. Brightness-setting signal 8/16-(1) has the same shape as signal 8/16-(0) but is phase shifted by one frame period (FP). Brightness-setting signals 4/16-(0) through 4/16-(3) have only four of their total sixteen command bits in the ON state during frames $O_{hex}$-$F_{hex}$ and these ON command bits are equally distributed across the sixteen-frame period. The last brightness-setting signal, 0/16-(0) has none of its sixteen command bits set to the ON state during the sixteen-frame period.

It will be appreciated from FIG. 4D that a relatively high brightness level, B3 (i.e. white), may be generated by applying the 16/16 waveform; a lower brightness level, B2 (50%), can be generated by applying either of the two 8/16 signals; a dimmer brightness level, B1 (25%), may be established by applying any of the four 4/16 signals and a minimum brightness level, B0 (i.e. black), may be established by applying the 0/16 signal to an individual pixel. Since multiple phases of the 8/16 and 4/16 signals are available, phase interlacing may be used to reduce flickering.

Figure 4E:
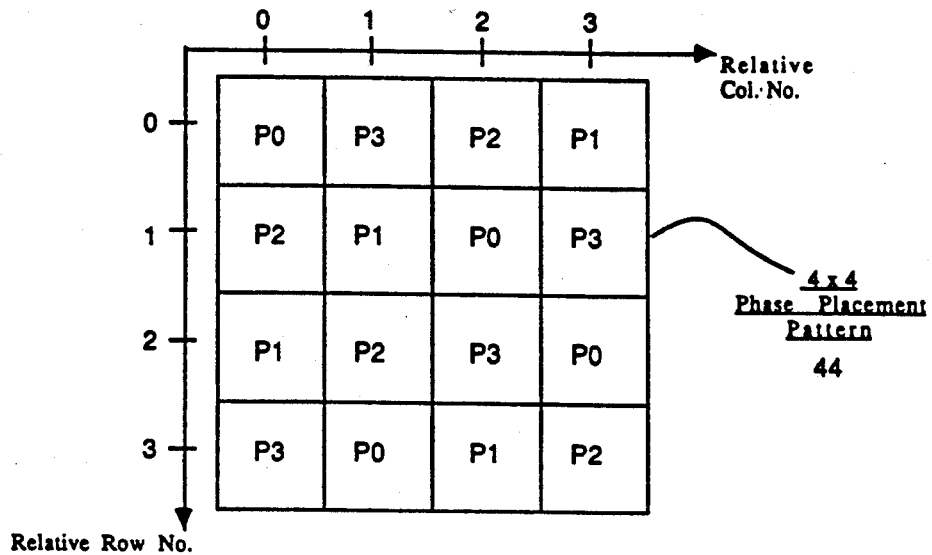
FIG. 4E illustrates a possible phase-placement pattern for the brightness-setting waveforms illustrated in FIG. 4D.
Figure 4D:
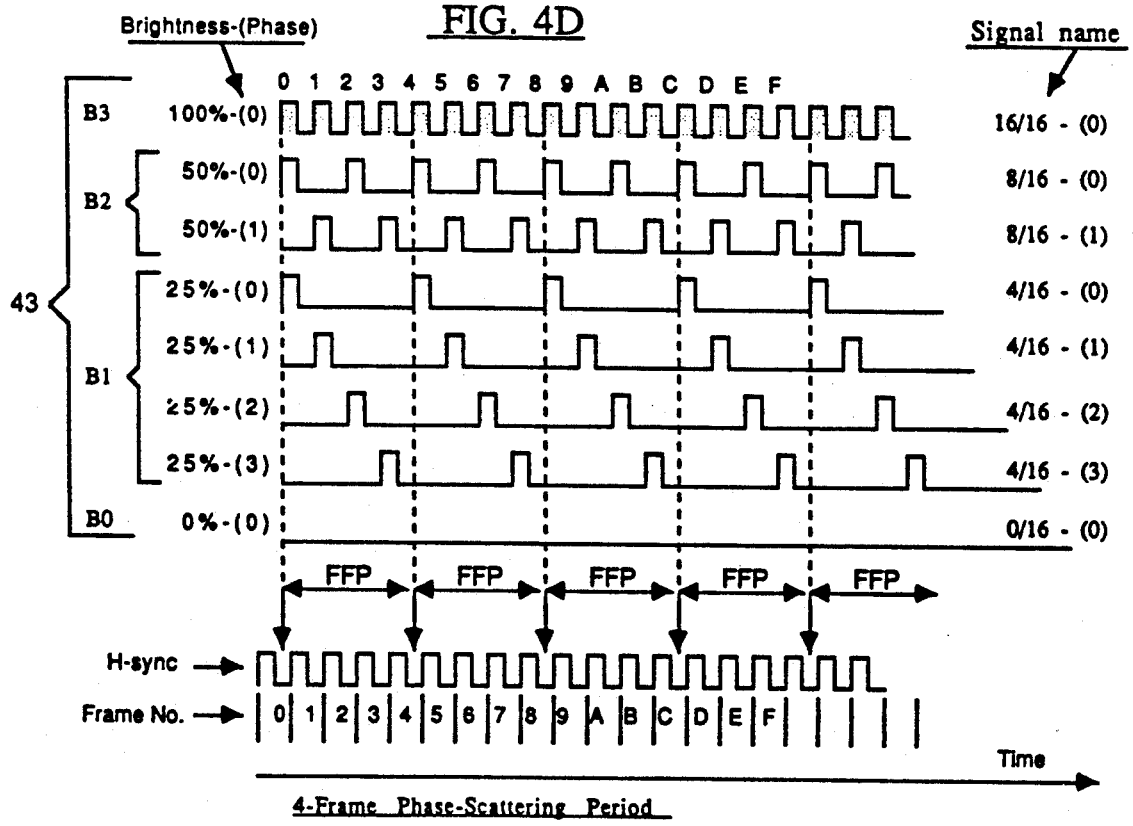
FIG. 4D illustrates a set of brightness-setting waveforms wherein the next to lowest brightness-setting waveform has four phases.

Referring to FIG. 4E, there is shown a four-by-four (4×4) phase-placement pattern 44 illustrating how the four phases (0)-(3) of the 4/16 brightness-setting signals depicted in FIG. 4D may be ordered according to relative row and column numbers. During frame zero, all relative pixel locations having the designation P0 (phase zero) will be energized (on a line-by-line basis). At a relative row number 0, the pixel of relative column number 0 will be energized. At relative line number 1, the pixel at relative column number 2 will be energized. At relative row number 2, the pixel of relative column 3 will be energized, and at relative row number 3, the pixel of relative column 1 will be energized. During frame one, all the pixel locations having the designation P1 will be energized in a like manner. The same applies for frames two and three. During frame number four, the pixels designated by phase P0 will again be energized. Relative row and column numbers may be obtained by extracting the remainder of a divide-by-four operation performed on the actual row and column numbers (i.e., by performing a modulo-4 operation). At the end of the sixteen-frame period, the process is repeated.

Figure 4F:
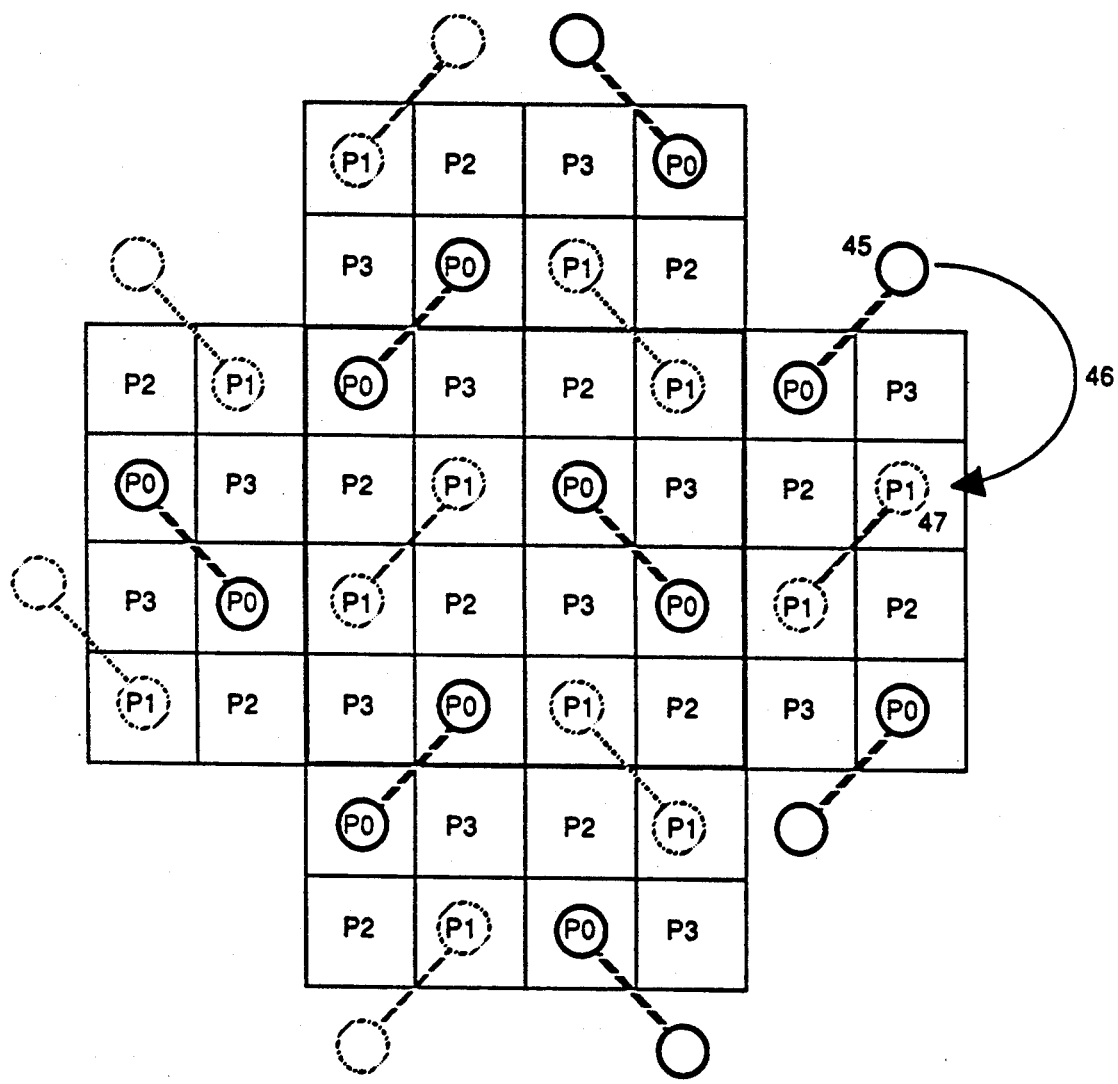
FIG. 4F illustrates how visual disturbances can be created by the phase-placement pattern of FIG. 4E.

Referring to FIG. 4F, it was thought that by scattering phases across a four-by-four placement pattern 44, the visual disturbances associated with the three by three pattern 41 of FIG. 4B could be obviated. But when such a method was attempted by simulating on a computer, it was discovered that a significant movie marquee motion could be created when the frame rate was reduced. If the four-by-four pattern 44 of FIG. 4E is tiled across a display as shown in FIG. 4F, it can be seen that pairs of diagonally adjacent pixels 45 are energized during a common frame (P0 for frame zero) and that during an immediately subsequent frame, the pattern shifts vertically 46 by two rows (pixels P1 of frame one) to repeat at 47 thereby creating the possibility of a movie marquee effect.

Figures 5A, 5B:
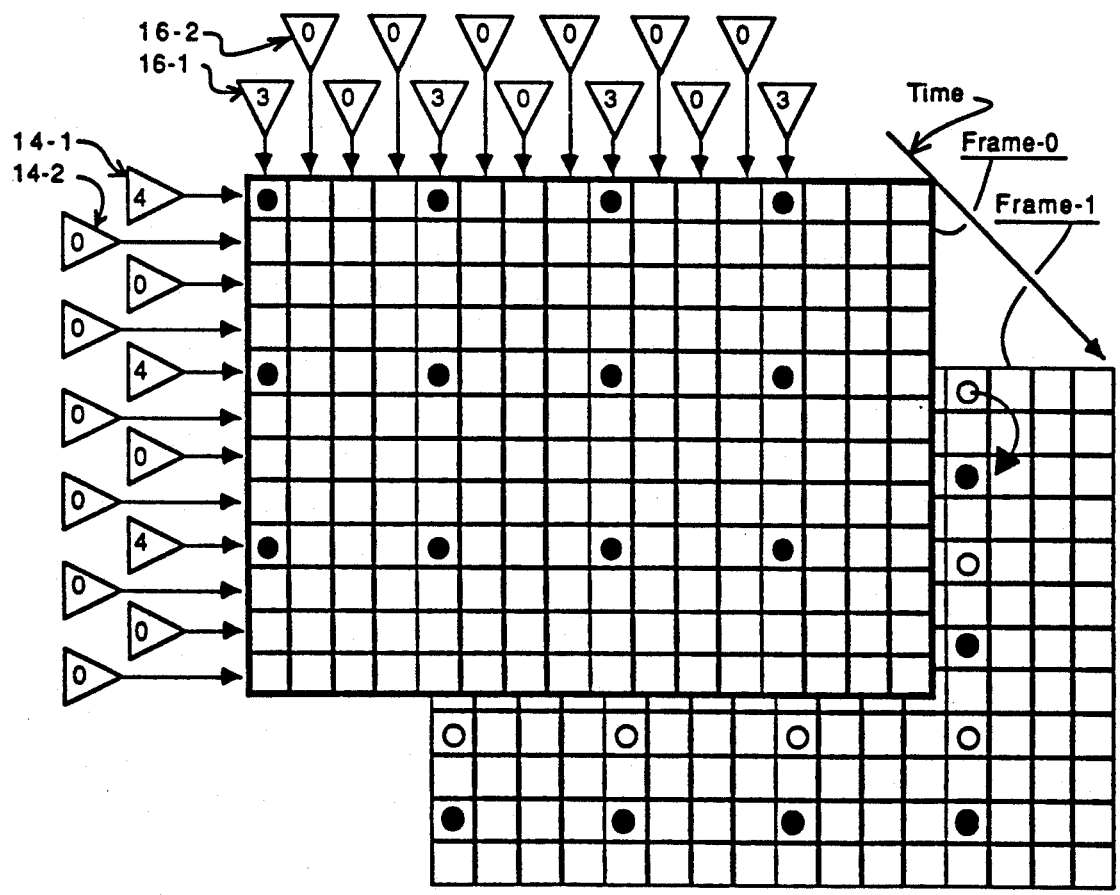
FIG. 5A shows a possible 4×4 phase-placement pattern for a brightness-setting waveform having 16 different phases.
FIG. 5B illustrates how unbalanced loading of row and column drivers may occur using the 4×4 phase-placement pattern illustrated in FIG. 5A.

Referring to FIG. 5A, it was next thought that if the next to lowest brightness level, B1, could be generated by a 1/16 signal of sixteen different phases (P0 through PF) that the visual disturbances most immediately associated with such a low brightness level B1 could be obviated. The idea was to scatter different phases throughout the illustrated phase-placement pattern 50 so that when the pattern 50 is tiled across the display surface, points of the same phase would not be immediately adjacent to one another either diagonally, vertically or horizontally. Unfortunately, this technique produced a new set of visual disturbances.

Referring to FIG. 5B, it can be seen that if the four by four pattern 50 of FIG. 5A were to be tiled across a display screen and all the P0 pixels were shown to be lit during frame zero, that uneven loading of the row and column drivers would result, and that this uneven loading would continue from one frame to the next. Some of the row and column drivers, 14-1 and 16-1, would be energizing a relatively large number (3-4) of pixels during a single frame while others of the row and column drivers, 14-2 and 16-2, would be energizing a relatively low number (0) of pixels because, as seen in FIG. 1A, row and column drivers, 14 and 16, tend to be tied to common power rails, +V and −V, unbalanced loading of the row and column drivers can produce undesirable visual disturbances in a displayed image.

Figure 6A:
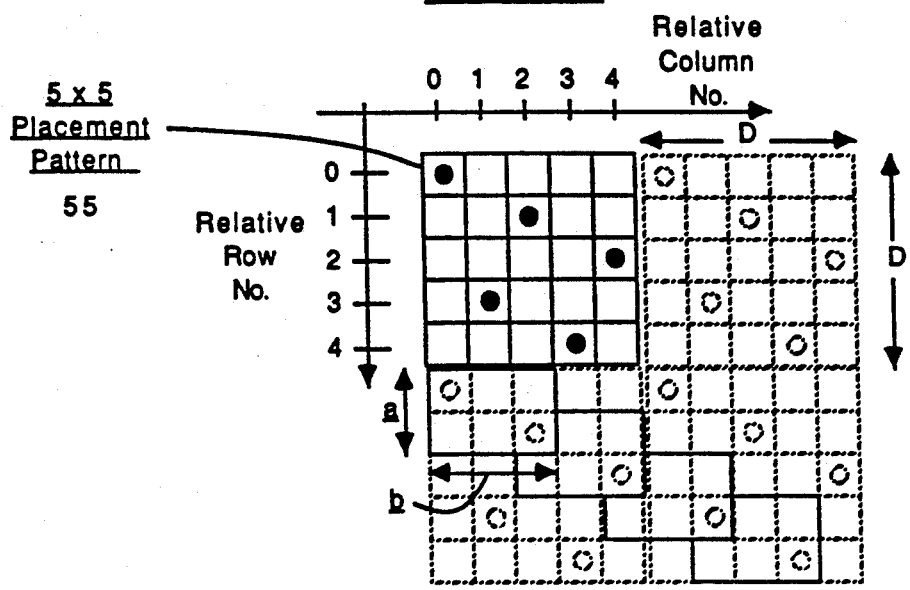
FIG. 6A illustrates a 5×5 phase-placement matrix in accordance with the present invention.

Referring to FIG. 6A, a five by five placement pattern 55 was next tested using five phases (P0, P1, P2, P3, P4) of a 1/5 brightness-setting signal (one ON command followed by four OFF commands). The darkened circles shown in the pattern 55 of FIG. 6A represent pixels which are being energized during a single frame (i.e. all phase P0 pixels). It can be seen that the energized pixels of a single frame are spaced apart from one another in accordance with the movement of a knight piece in the game of chess (one over and two down).

Figure 6B:
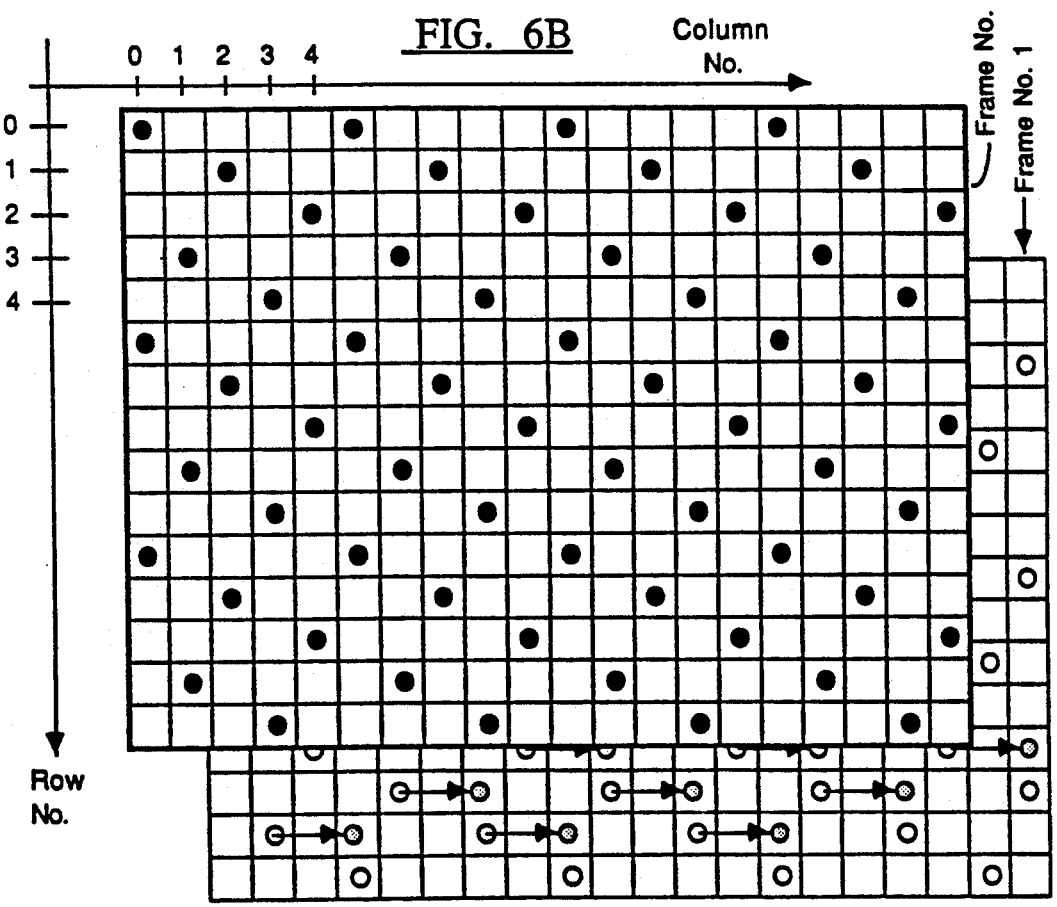
FIG. 6B illustrates two frames in time of a display area which is tiled by the 5×5 phase-placement matrix shown in FIG. 6A.

Referring to FIG. 6B, wherein the pattern of FIG. 6A is tiled across a larger surface, it can be seen that relatively uniform loading of all row and column drivers may be obtained. It can also be seen that the energized pixels of a single frame (where a large display area is being commanded to a single brightness level, B1 for example), are scattered apart from one another both visually and electrically so that visual and electrical crosstalk may 'ie suppressed during each individual frame.

Referring back to FIG. 6A, it is believed that the scattering shown in FIG. 6B is due to the formation in both the vertical and horizontal directions of irregular rectangles having dimensions a pixels by b pixels, where diagonally opposed corners of the irregular rectangles are defined by energized pixel locations. To allow for a checkerboard style tiling of an entire display area by phase-placement patterns incorporating such irregular a by b rectangles, the side dimension D of each phase-placement pattern may be selected in accordance with the equation:

$$D = na - 1 = mb - 1$$

where a is not equal to b and where a, b, n, m, and D are integers greater than zero. It appears that the equation:

$$D = i^2 + 1$$

may be used to generate the dimension of such phase-placement patterns.

Figure 6C:
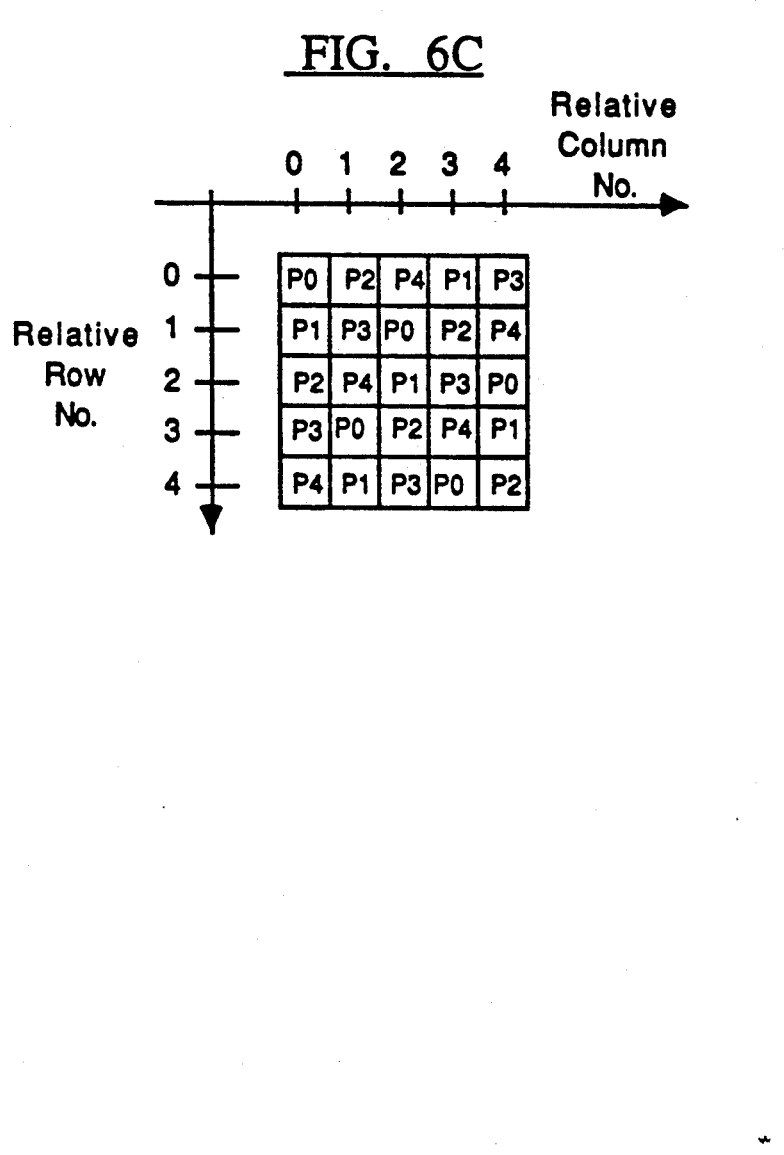

Referring to FIG. 6C, a phase placement pattern having the same phases repeated in accordance with the dotted locations of FIG. 6A, is shown. Sequential phases (i.e., P0, P1, P2, . . .) are preferably ordered along each row so as to be spaced apart by at least one pixel area from the pixel of a previous or next to be energized pixel.

While the five by five placement pattern 55 of FIG. 6A succeeded in overcoming the unbalanced loading problem, it was found that larger sized phase-placement patterns can provide superior grayscaled images. Referring to FIG. 6B, it will be noted that when the pixels of a next displayed frame (No. 1) are energized, using a phase-placement pattern dimension D of five, there is no way to position these next energized pixels such that they are spaced apart from the previously energized pixels of adjacent rows in a previous frame, as indicated by the representation in FIG. 6B of frame No. 1 underlying the representation of frame No. 0. (Previously energized pixels are shown to be filled with white in the representation of frame No. 1 and the newly energized pixels are darkened.)

Figure 7A:
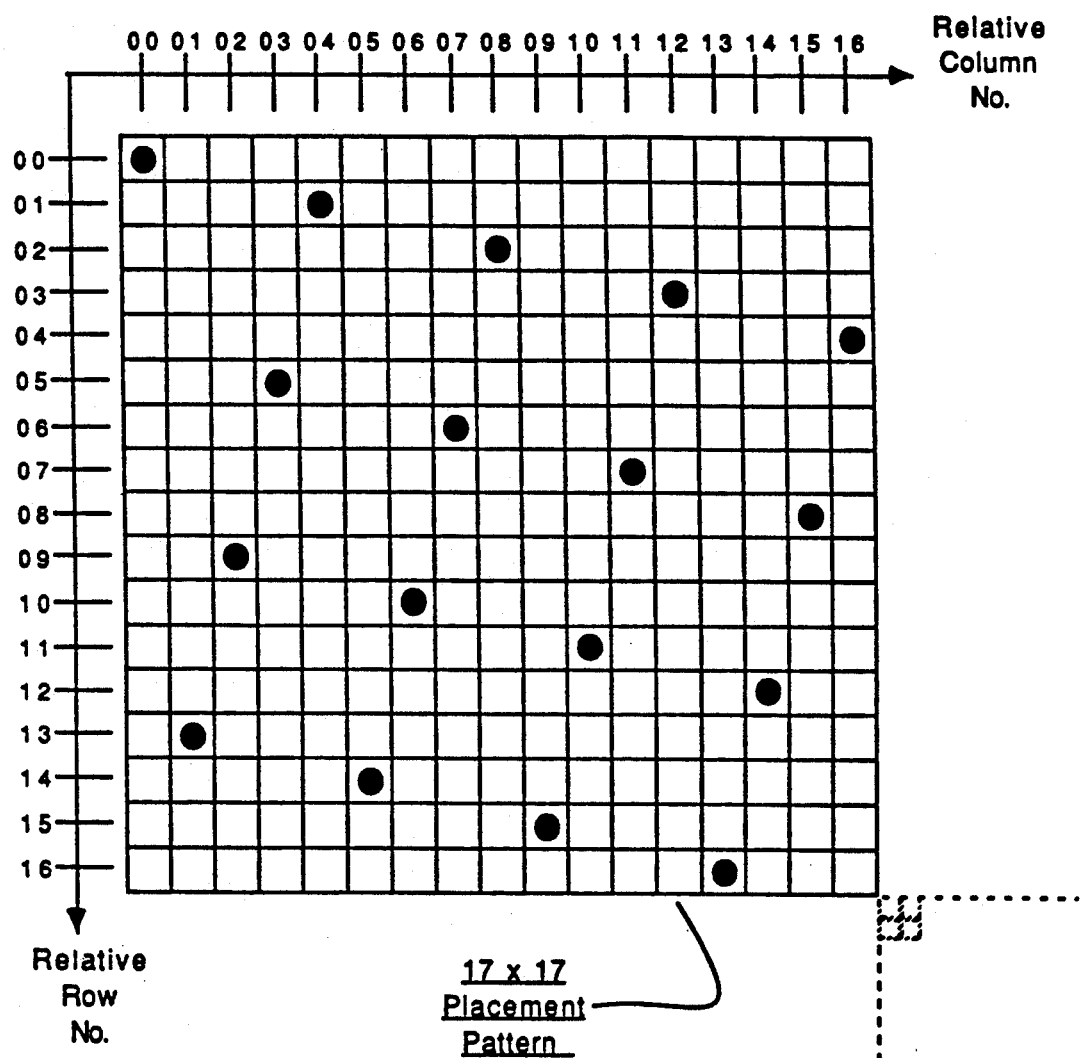
FIG. 7A illustrates a 17×17 phase-placement pattern in accordance with the invention.

Referring to FIG. 7A, a seventeen by seventeen phase placement pattern 77 was tested. The placement of energized pixels in this pattern occurs according to a one down and four over movement (a=1, b=4). It can be seen that relatively uniform loading of the row and column drivers will continue to take place with this seventeen by seventeen pattern 77. It will also be observed, by referring to FIG. 7B, that a subsequent frame can have next energized pixels (a single one of which is represented by a darkened circle) which are spaced apart by at least one pixel area from previously energized pixels (white filled circles) both in the row and column directions. A remarkable improvement in the perceived image was observed when this seventeen-by-seventeen phase-placement pattern was tested.

Figure 7B:
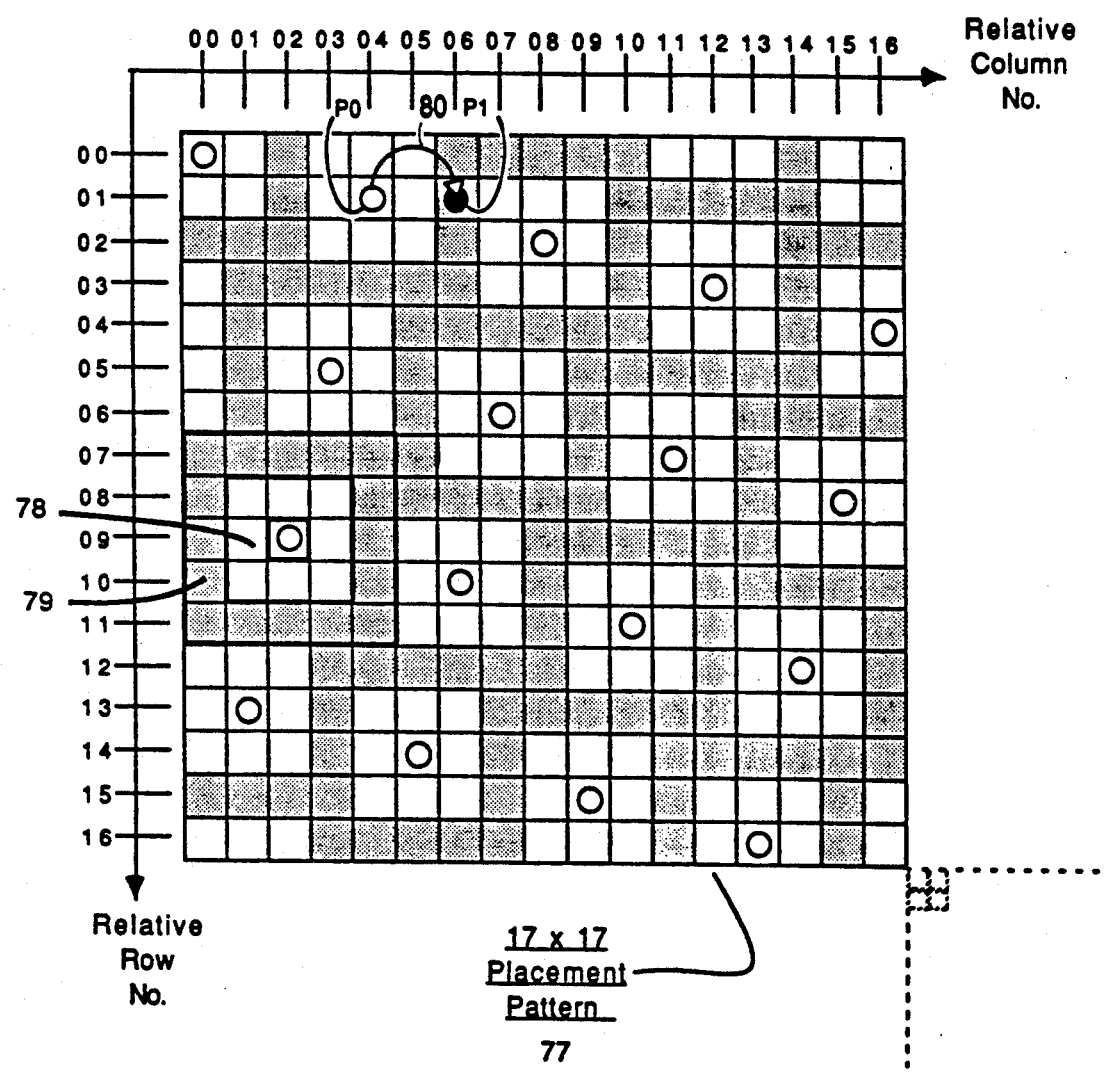
FIG. 7B illustrates a preferred distance jump to be made by the pixel energizing points of sequential frames.

In FIG. 7B, each previously energized pixel P0 (denoted by white filled circle) is shown to be immediately surrounded by eight white filled squares 78 (which are energized by different phases, not shown) and the latter eight squares are next immediately surrounded by a darkened square periphery 79 of sixteen pixels. The darkened peripheral regions 79 of FIG. 7B represent preferred locations at which the next pixel-energizing pulse (phase P1, represented by black circle) is to be placed. While the movement 80 of only one phase-placement is illustrated in FIG. 7B, it is to be understood that the pattern of all previously energized points (white filled circles) is to be shifted in accordance with the same movement 80 so that the one-down, four-across knight's tour is preserved for the next frame of pixel-energizing commands. It is to be further understood, that although the movement 80 shown in FIG. 7B depicts a pattern shift of two places along a single row, that it is within the contemplation of the invention to provide pattern movements which move the previous pixel-energizing points of phase P0 to any other location within the darkened regions 79 while preserving the relative knight's tour relationship between the pixel energizing points of the next frame. Moreover, it is to be understood that it is within the contemplation of the invention to produce frame-to-frame movements 80 within the 17-by-17 placement pattern other than directly into the darkened regions 79 (i.e., oscillating about one and the other sides of the darkened regions). Thus far, the discussion has assumed a brightness-setting signal of the form 1/D which has only one ON command bit within a phase-scattering period of D frame periods (FP). The analysis can become more complicated when other brightness-setting signals of the form k/D are considered, where k is an integer greater than one but less than D. A complex analysis using Fourier transforms taken both temporally and spatially may be required to determine the optimal movement of energizing pixels from one frame to the next for each type of brightness-setting waveform k/D.

Figure 7E:
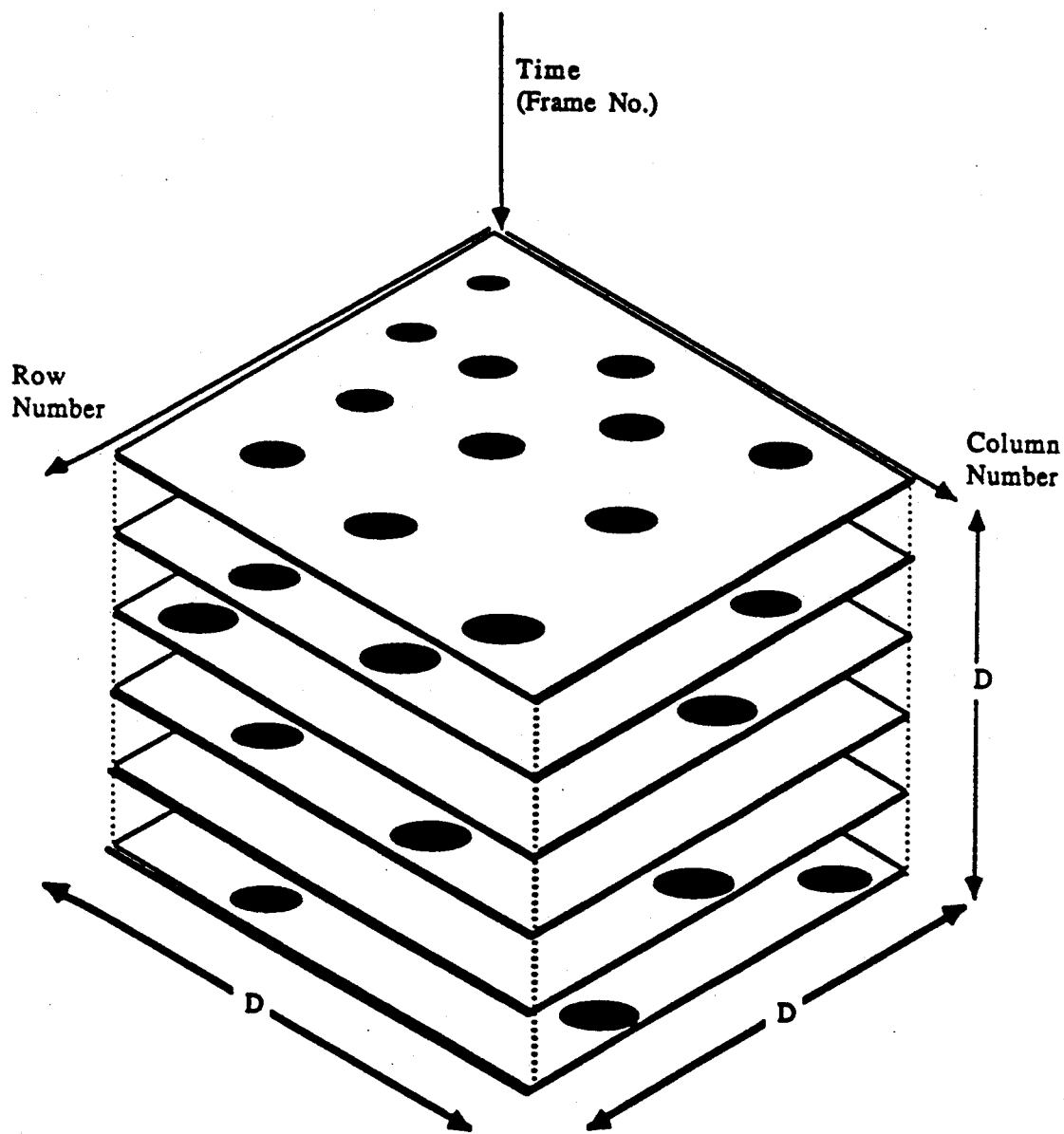
FIG. 7E is a three dimensional conceptualization of multiple frames attacked along a time axis.

Referring to FIG. 7E, it can be seen that the overall problem involves analysis in at least three dimensions: two spatial dimensions (row and column), and one temporal dimension (frame numbers). One of the ideas behind the disclosed invention is to scatter energizing points in the illustrated three-dimensional cube so that a stable image is perceived by the temporal and spatial integrating mechanisms of the human eye. When raster-scan type of displays are considered, crosstalk between the pixels of a single row and between sequentially energized lines, and further between sequentially energized frames must be further considered. A heuristic approach, using computer simulation and a trial and error method, was taken by the present inventors.

Referring to the below table (Table 1) of preferred diagonal tours and their resulting phase placement squares, it can be seen that a wide variety of phase placement squares may be created to provide generally balanced loading across a multiplexed display. Not all sizes of phase placement pattern matrices have placement patterns that satisfy the principles of balanced loading and scattering the pixels energized in any particular frame. It appears that the size D of any D by D matrix for which a good placement pattern exists should satisfy the following constraint:

$$D = a^2 + b^2,$$

for some value of a that is not evenly divisible into D, and for some value of b that is not evenly divisible into D In the below Table 1, it is assumed that the lowest above black, brightness-setting waveform will consist of one out of D pulses associated with an ON command (a 1/D-(p) signal) and that, as a consequence, D+1 brightness levels will be possible.

TABLE 1

| Diagonal Tours | | RESULTING PHASE PLACEMENT SQUARES | NUMBER OF POSSIBLE BRIGHTNESS LEVELS |
|---|---|---|---|
| DOWN | ACROSS | | |
| 1 | 1 | 1 × 1 | 2 |
| 1 | 2 | 5 × 5 | 6 |
| 1 | 3 | 10 × 10 | 11 |
| 1 | 4 | 17 × 17 | 18 |
| 1 | 5 | 26 × 26 | 27 |
| 1 | 6 | 37 × 37 | 38 |
| 1 | 7 | 50 × 50 | 51 |
| 1 | 8 | 65 × 65 | 66 |
| 2 | 3 | 13 × 13 | 14 |
| 2 | 5 | 29 × 29 | 30 |
| 2 | 7 | 53 × 53 | 54 |
| 3 | 4 | 25 × 25 | 26 |
| 3 | 5 | 34 × 34 | 35 |

An algorithm that generates each such value of D, a and b for all values of a and b up to 100 is as follows:
for each a from 1 to 100
for each b from 1 to a
$D = a^2 + b^2$
if a evenly divides D OR b evenly divides D, then
reject this a and b pair and try the next pair;
otherwise,
print D, a, b Referring to FIGS. 7C and 7D, two phase-placement patterns for a 2/17 brightness-setting signal in accordance with the invention are shown. These patterns were developed empirically using the 2/17 signal waveform shown in FIG. 8. With respect to FIG. 7C, it should be noted that each horizontal row is filled with phase numbers having the wraparound sequence 0, 7, 14, 4, 11, 1, 8, 15, 5, 12, 2, 9, 16, 6, 13, 3, 10. This wraparound sequence (array) is repeated in each row but shifted in accordance with the modified knight's tour (one down, four across) with respect to each of the specific phase numbers. The relationship between the last phase number in a first row of the phase placement pattern (FIG. 7C) and the first phase number in a next subsequent row may be calculated by adding 13 to the last phase number of the first row and extracting the remainder of a divide-by-seventeen operation on the sum (performing a modulo-17 operation on the sum). For a general case D-by-D phase-placement pattern, the row to row change can be calculated by performing a modulo-D operation on the sum of the previous phase number and the difference value D-jb, where b is the horizontal dimension of the irregular rectangles and j is an integer accounting for the number of irregular rectangles fitting within the D-by-D phase-placement square.

With respect to FIG. 7D, the wraparound sequence is 0, 14, 11, 8, 5, 2, 16, 13, 10, 7, 4, 1, 15, 12, 9, 6, 3 for the same 2/17 waveform shown in FIG. 8A. It was empirically found that the phase placement pattern of FIG. 7D works best in cases where pixel brightness tends to be equal along a single row, from one column to the next. It was empirically found that the phase placement pattern of FIG. 7C appears to work best when it is found that a next-to-be-displayed pixel does not have a brightness value equal to a previously displayed pixel along the row. High quality images were obtained by dynamically switching between the phase-placement patterns of FIG. 7C and FIG. 7D depending on whether a next-to-be-displayed pixel has a brightness value equal to or not equal to a previously energized pixel.

The below Table 2 lists a plurality of phase-placement pattern building arrays (wrap around sequences) which were found preferred for the waveforms 0/17, 2/17-15/17 and 17/17 illustrated in FIG. 8A and also listed in the next following Table 3. Since the wraparound sequences of one row in a phase-placement pattern may be repeated row after row, it is only necessary to store such a wraparound sequence in memory as a phase-placement pattern building array and to reconstruct the entire phase-placement pattern by a suitable algorithm such as the modulo-17 addition of the value 13 described above.

TABLE 2

PATTERN ROM CONTENTS
Phase-placement-pattern building arrays for the case of
current pixel NOT EQUAL to previous pixel

| Phase Order ————> | | | | | | | | | | | | | | | | | Waveform No. |
|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | ;0/17 |
| 0 | 7 | 14 | 4 | 11 | 1 | 8 | 15 | 5 | 12 | 2 | 9 | 16 | 6 | 13 | 3 | 10 | ;2/17 (FIG. 7C) |
| 0 | 7 | 14 | 4 | 11 | 1 | 8 | 15 | 5 | 12 | 2 | 9 | 16 | 6 | 13 | 3 | 10 | ;3/17 |
| 0 | 6 | 12 | 1 | 7 | 13 | 2 | 8 | 14 | 3 | 9 | 15 | 4 | 10 | 16 | 5 | 11 | ;4/17 |
| 0 | 5 | 10 | 15 | 3 | 8 | 13 | 1 | 6 | 11 | 16 | 4 | 9 | 14 | 2 | 7 | 12 | ;5/17 |
| 0 | 15 | 13 | 11 | 9 | 7 | 5 | 3 | 1 | 16 | 14 | 12 | 10 | 8 | 6 | 4 | 2 | ;6/17 |
| 0 | 15 | 13 | 11 | 9 | 7 | 5 | 3 | 1 | 16 | 14 | 12 | 10 | 8 | 6 | 4 | 2 | ;7/17 |
| 0 | 15 | 13 | 11 | 9 | 7 | 5 | 3 | 1 | 16 | 14 | 12 | 10 | 8 | 6 | 4 | 2 | ;8/17 |
| 0 | 15 | 13 | 11 | 9 | 7 | 5 | 3 | 1 | 16 | 14 | 12 | 10 | 8 | 6 | 4 | 2 | ;9/17 |
| 0 | 15 | 13 | 11 | 9 | 7 | 5 | 3 | 1 | 16 | 14 | 12 | 10 | 8 | 6 | 4 | 2 | ;10/17 |
| 0 | 15 | 13 | 11 | 9 | 7 | 5 | 3 | 1 | 16 | 14 | 12 | 10 | 8 | 6 | 4 | 2 | ;11/17 |
| 0 | 5 | 10 | 15 | 3 | 8 | 13 | 1 | 6 | 11 | 1 | 4 | 9 | 14 | 2 | 7 | 12 | ;12/17 |
| 0 | 6 | 12 | 1 | 7 | 13 | 2 | 8 | 14 | 3 | 9 | 15 | 4 | 10 | 16 | 5 | 11 | ;13/17 |
| 0 | 7 | 14 | 4 | 11 | 1 | 8 | 15 | 5 | 12 | 2 | 9 | 16 | 6 | 13 | 3 | 10 | ;14/17 |
| 0 | 7 | 14 | 4 | 11 | 1 | 8 | 15 | 5 | 12 | 2 | 9 | 16 | 6 | 13 | 3 | 10 | ;15/17 |

TABLE 2-continued

| | | | | | | | | | | | | | | | | | |
|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | ;17/17 |

Phase-pattern-placement building arrays for the case of current pixel EQUAL to the previous pixel.

| | | | | | | | | | | | | | | | | | |
|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | ;0/17 |
| 0 | 14 | 11 | 8 | 5 | 2 | 16 | 13 | 10 | 7 | 4 | 1 | 15 | 12 | 9 | 6 | 3 | ;2/17 (FIG. 7D) |
| 0 | 14 | 11 | 8 | 5 | 2 | 16 | 13 | 10 | 7 | 4 | 1 | 15 | 12 | 9 | 6 | 3 | ;3/17 |
| 0 | 11 | 5 | 16 | 10 | 4 | 15 | 9 | 3 | 14 | 8 | 2 | 13 | 7 | 1 | 12 | 6 | ;4/17 |
| 0 | 12 | 7 | 2 | 14 | 9 | 4 | 16 | 11 | 6 | 1 | 13 | 8 | 3 | 15 | 10 | 5 | ;5/17 |
| 0 | 9 | 1 | 10 | 2 | 11 | 3 | 12 | 4 | 13 | 5 | 14 | 6 | 15 | 7 | 16 | 8 | ;6/17 |
| 0 | 11 | 5 | 16 | 10 | 4 | 15 | 9 | 3 | 14 | 8 | 2 | 13 | 7 | 1 | 12 | 6 | ;7/17 |
| 0 | 11 | 5 | 16 | 10 | 4 | 15 | 9 | 3 | 14 | 8 | 2 | 13 | 7 | 1 | 12 | 6 | ;8/17 |
| 0 | 11 | 5 | 16 | 10 | 4 | 15 | 9 | 3 | 14 | 8 | 2 | 13 | 7 | 1 | 12 | 6 | ;9/17 |
| 0 | 11 | 5 | 16 | 10 | 4 | 15 | 9 | 3 | 14 | 8 | 2 | 13 | 7 | 1 | 12 | 6 | ;10/17 |
| 0 | 9 | 1 | 10 | 2 | 11 | 3 | 12 | 4 | 13 | 5 | 14 | 6 | 15 | 7 | 16 | 8 | ;11/17 |
| 0 | 12 | 7 | 2 | 14 | 9 | 4 | 16 | 11 | 6 | 1 | 13 | 8 | 3 | 15 | 10 | 5 | ;12/17 |
| 0 | 11 | 5 | 16 | 10 | 4 | 15 | 9 | 3 | 14 | 8 | 2 | 13 | 7 | 1 | 12 | 6 | ;13/17 |
| 0 | 14 | 11 | 8 | 5 | 2 | 16 | 13 | 10 | 7 | 4 | 1 | 15 | 12 | 9 | 6 | 3 | ;14/17 |
| 0 | 14 | 11 | 8 | 5 | 2 | 16 | 13 | 10 | 7 | 4 | 1 | 15 | 12 | 9 | 6 | 3 | ;15/17 |
| 0 | 0 | 0 | 0 | 0 | 0 | 0 | 0 | 0 | 0 | 0 | 0 | 0 | 0 | 0 | 0 | 0 | ;17/17 |

The below Table 3 lists the preferred command bits for each of the waveforms 0/17, 2/17-15/17 and 17/17 shown in FIG. 8A. It should be noted that brightness-setting waveforms 1/17 and 16/17 have been intentionally omitted. The reason for this is that it was desired to have only sixteen different brightness levels for efficient use of the four video data bits provided by an external circuit. It was empirically found that elimination of the 1/17 and 16/17 waveforms provided the best results.

TABLE 3
16-BRIGHTNESS-LEVEL WAVEFORMS
(When grayscale mirroring is used, waveform ROM contains only the first eight)

| Command bits 0-9, A-G | | | | | | | | | | | | | | | | Waveform No. |
|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | Gray-scale 0/17 |
| 1 | 0 | 0 | 0 | 0 | 0 | 0 | 0 | 1 | 0 | 0 | 0 | 0 | 0 | 0 | 0 | Gray-scale 2/17 |
| 1 | 0 | 0 | 0 | 0 | 0 | 1 | 0 | 0 | 0 | 0 | 0 | 1 | 0 | 0 | 0 | Gray-scale 3/17 |
| 1 | 0 | 0 | 0 | 1 | 0 | 0 | 0 | 1 | 0 | 0 | 1 | 0 | 0 | 0 | 0 | Gray-scale 4/17 |
| 1 | 0 | 0 | 1 | 0 | 0 | 0 | 1 | 0 | 0 | 1 | 0 | 0 | 0 | 1 | 0 | Gray-scale 5/17 |
| 1 | 0 | 0 | 1 | 0 | 0 | 1 | 0 | 0 | 1 | 0 | 0 | 1 | 0 | 0 | 1 | Gray-scale 6/17 |
| 1 | 0 | 0 | 1 | 0 | 1 | 0 | 0 | 1 | 0 | 0 | 1 | 0 | 1 | 0 | 1 | Gray-scale 7/17 |
| 0 | 1 | 0 | 1 | 0 | 1 | 0 | 1 | 0 | 1 | 0 | 1 | 0 | 1 | 0 | 0 | Gray-scale 8/17 |
| 1 | 0 | 1 | 0 | 1 | 0 | 1 | 0 | 1 | 0 | 1 | 0 | 1 | 0 | 1 | 1 | Gray-scale 9/17 |
| 0 | 1 | 1 | 0 | 1 | 0 | 1 | 1 | 0 | 1 | 0 | 1 | 1 | 0 | 1 | 1 | Gray-scale 10/17 |
| 0 | 1 | 1 | 0 | 1 | 1 | 0 | 1 | 1 | 0 | 1 | 1 | 0 | 1 | 1 | 1 | Gray-scale 11/17 |
| 0 | 1 | 1 | 0 | 1 | 1 | 1 | 0 | 1 | 1 | 1 | 0 | 1 | 1 | 0 | 1 | Gray-scale 12/17 |
| 0 | 1 | 1 | 1 | 0 | 1 | 1 | 1 | 0 | 1 | 1 | 1 | 0 | 1 | 1 | 1 | Gray-scale 13/17 |
| 0 | 1 | 1 | 1 | 1 | 0 | 1 | 1 | 1 | 1 | 0 | 1 | 1 | 1 | 1 | 1 | Gray-scale 14/17 |
| 0 | 1 | 1 | 1 | 1 | 1 | 1 | 0 | 1 | 1 | 1 | 1 | 1 | 1 | 1 | 1 | Gray-scale 15/17 |
| 1 | 1 | 1 | 1 | 1 | 1 | 1 | 1 | 1 | 1 | 1 | 1 | 1 | 1 | 1 | 1 | Gray-scale 17/17 |

Figure 8:
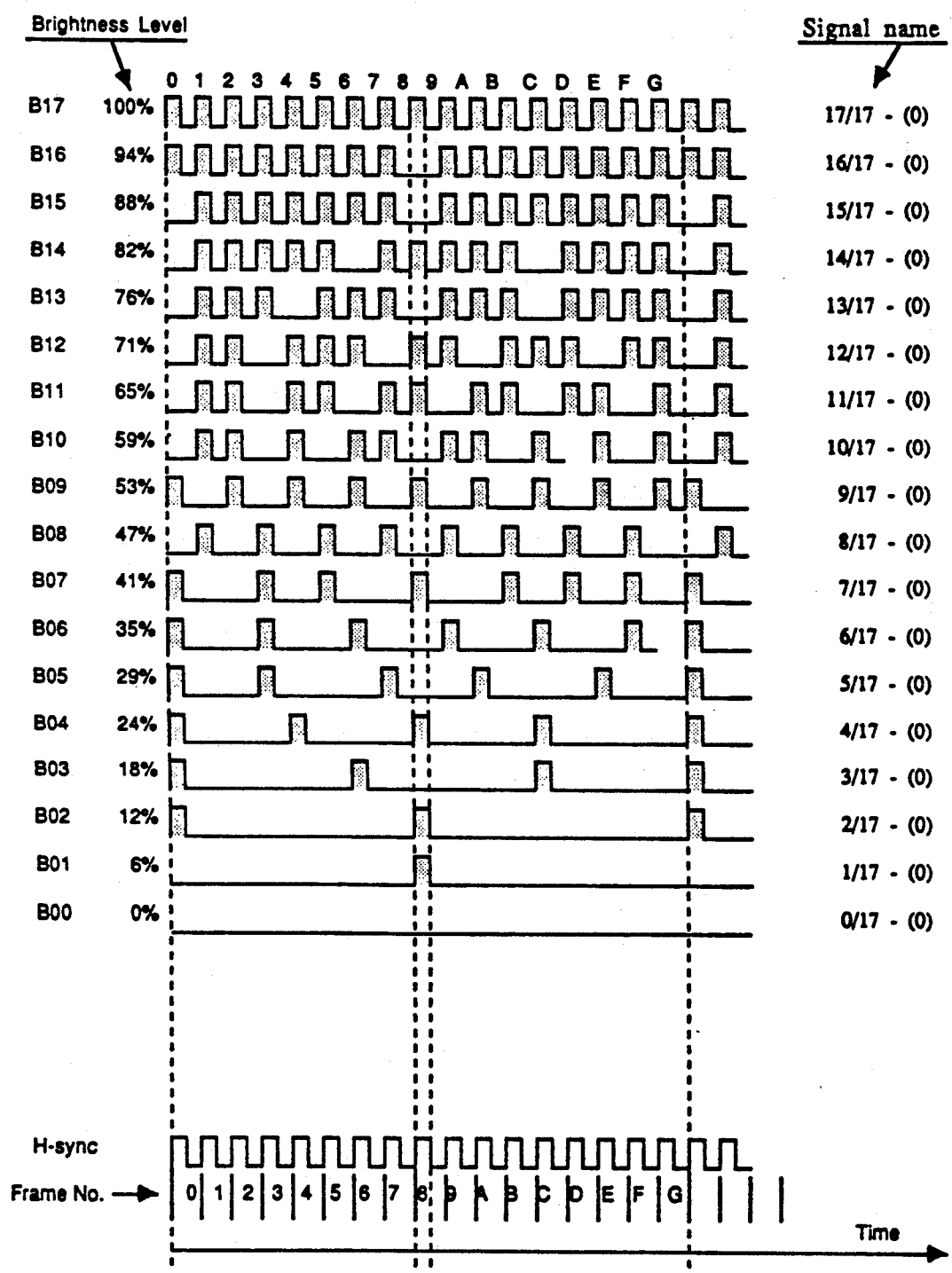
FIG. 8 shows a set of brightness-setting waveforms in accordance with the invention.

Referring both to the above Table 3 and to FIG. 8, it will be noted that the illustrated waveforms 0/17-17/17 are formed of mirror image complements (grayscale mirroring). The command bits of the 0/17 waveform are binary complements of the command bits of the 17/17 waveform. The command bits of the 2/17 waveform are binary complements of the 15/17 waveform. This repeats for waveforms 3/17 through 14/17. The advantage of such an arrangement is that only one half of the bits representing the waveforms need to be stored in a memory device and the other half may be formed by performing a NOT operation (i.e. a selective exclusive OR operation) on the bits of the first half. It should be noted that the waveforms of FIG. 8 provide relatively uniform graduations of brightness level in the range between 0% and 100%.

Figure 9:
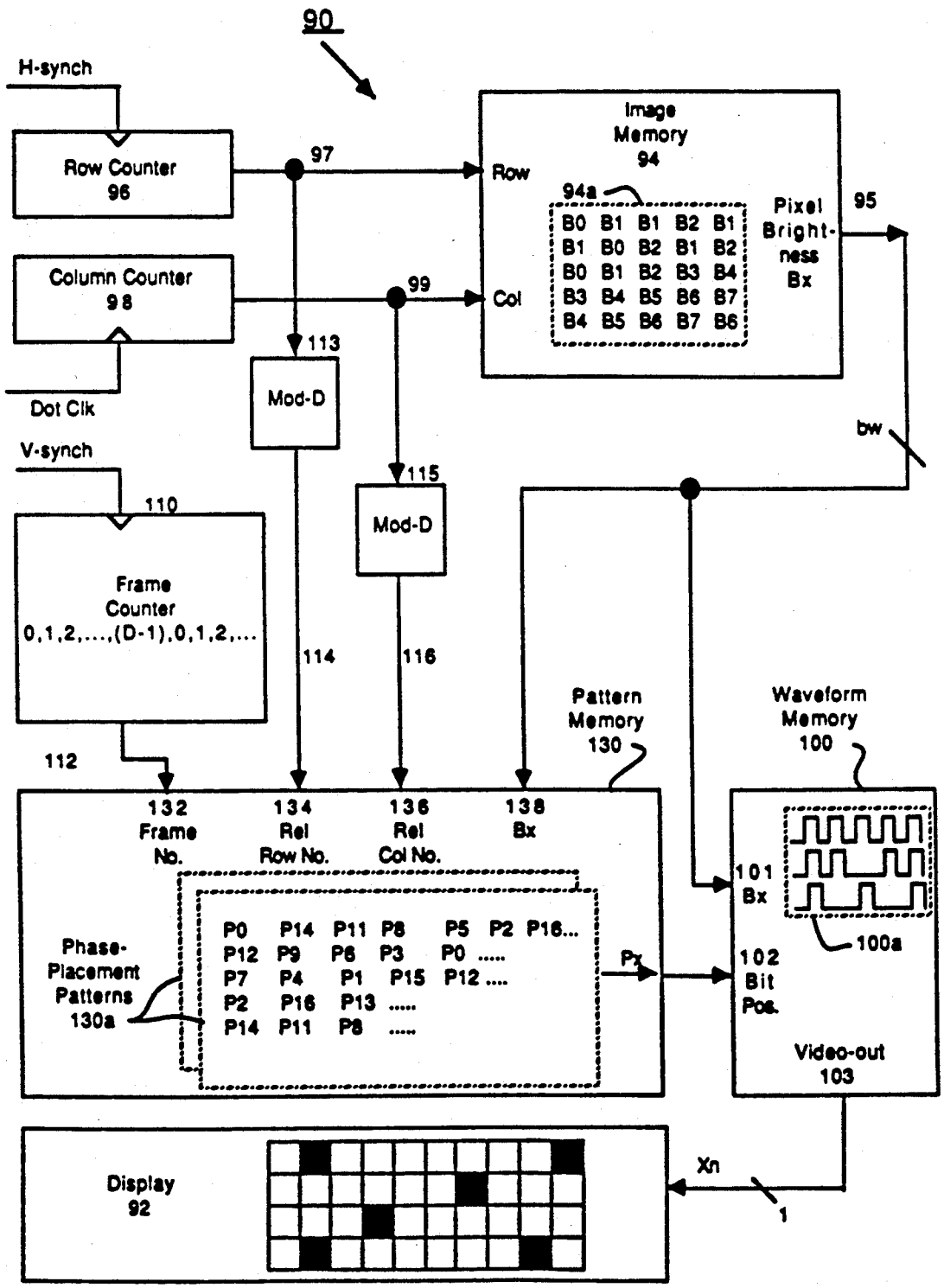
FIG. 9 is a block diagram of a first brightness control system in accordance with the invention.

Referring to FIG. 9, there is shown a first system 90 for generating grayscaled images on a digitally commanded display unit 92. Digital information 94a representing the brightness values (B0-Bx, x being a predetermined integer here) are prestored in an image memory 94. The image memory 94 is addressed by a row number output 97 of a row counter 96 and a column number output 99 of a column counter 98. The row and column counters, 96 and 98, are respectively clocked by the H-synch and dot clocks. In response to the outputs, 97 and 99 of the row and column counters, the image memory 94 outputs video data 95 representing a brightness level Bx which is to be perceived at a pixel area whose location is identified by the row and column number outputs, 97 and 99, of the row and column counters, 96 and 98. The bit width bw of the memory output video data 95 is selected in accordance with the number of brightness levels Bx which are to be displayed. Preferably, the number of brightness levels to be displayed should be a power of the number two in order to make efficient use of the available bit width bw of the memory output video data 95. Moreover, the number of brightness levels should be selected to allow uniform phase scattering in a predetermined phase-placement pattern of dimensions D×D.

The memory output video data 95 is coupled to a first address input port 101 of a waveform memory 100 for supplying a brightness level value Bx to the waveform memory 100. The waveform memory 100 is programmed to c⁻ itain digital bit sequences 100a representing the ON/OFF command levels of a predetermined number of brightness-setting waveforms such as those shown in the above Table 3. A desired one of the stored brightness-setting waveforms is selected by the brightness level value Bx supplied in the memory output video data 95. A specific bit position within the selected brightness-setting waveform is selected by digital phase-value data Px presented to a second address port 102 of the waveform memory 100. The combination of the brightness value Bx and the phase-value Px defines an address for selecting a specific ON/OFF command bit within the waveform memory 100. The ON/OFF command bit selected by the combination of addressing data presented at the first and second address ports, 101 and 102, of the waveform memory 100 is output at a data-out port 103 of the waveform memory 100 and coupled to the display unit 92. A one-bit wide video bit stream Xn comprising plural selected output bits generated at the data output port 103 of the waveform memory 100 is used to sequentially command pixels within the display 92 towards either a bright or dim level of luminance.

The dot clock and H-synch signals coupled to the column and row counters, 98 and 96, are selected so as to fill a full "frame" of the display unit 92 within a predetermined time period. In the case where the display unit 92 is a liquid crystal display panel having 640 columns by 200-240 rows, it is preferred that a frame refresh cycle should be completed in less than one fiftieth (1/50) of a second. A V-synch pulse is applied to the clock input of a frame counter 110 at the beginning of each frame. The frame counter is designed to perform a modulo-D count, that is, to output sequential values 0, 1, 2, . . ., (D-1) and to repeat the sequence again. For the case where a seventeen-by-seventeen phase-placement pattern is used, the frame counter 110 is a modulo-17 counter.

A frame number 112 output by the frame counter 110 is applied to a frame-number address port 132 of a phase-placement memory 130. The phase-placement memory 130 contains binary information representing one or more phase-placement patterns 130a as described before. The represented phase-placement patterns 130a are preferably square ones of dimensions D×D.

To determine which bit position of a preselected brightness-setting waveform 100a is to be output, the phase-placement memory (pattern memory) 130 receives, in addition to the modulo-D frame number 112 produced by frame counter 110, a relative row number 114 produced by a first modulo-D function unit 113 at a second address input port 134 of memory 130 and a relative column number 116 produced by a second modulo-D function unit 115 at a third address input port 136 of the phase-placement memory 130. Additionally, the phase-placement memory 130 receives the image-memory output video data 95 at a fourth address input port 138 thereof so as to select an appropriate one of the phase-placement patterns 130a stored therein, and based on the relative row and column numbers received at second and third input ports 134 and 136, to select a specific matrix cell within the selected phase-placement pattern; and based on the modulo-D frame count 112 output by frame counter 110, to instruct the bit position input 102 of the waveform memory 100 with a phase-value number Px indicating exactly which bit position in the selected brightness-setting waveform is to be output at data-output port 103 of the waveform memory 100.

The first modulo-D function unit 113 receives the row count output 97 of row counter 96 and outputs a relative row value 114 representing the operation modulo-D (row count). The second modulo-D function unit 115 receives the column number 99 output by column counter 98 and outputs a relative column number 116 representing the value modulo-D (column count).

Figure 10:
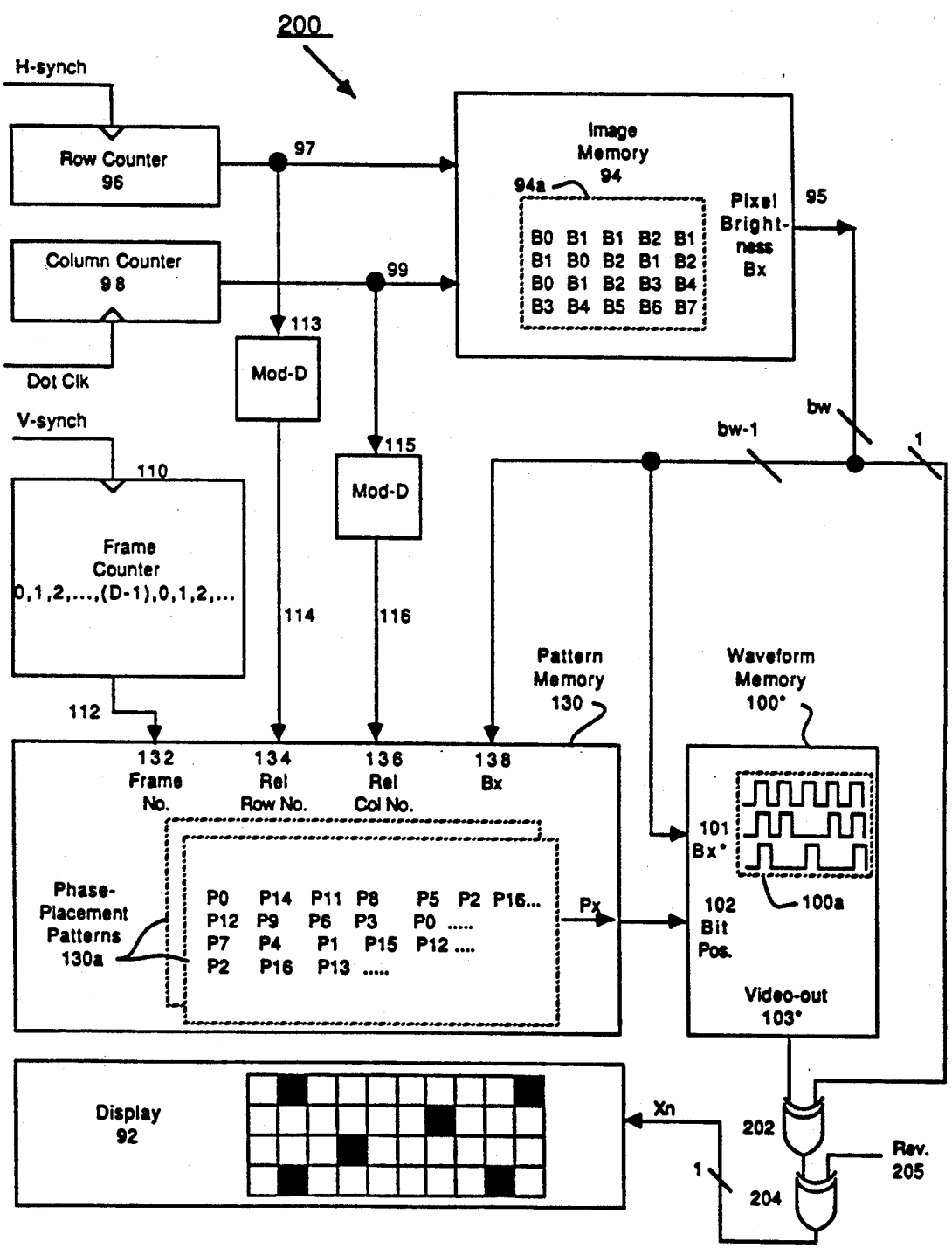
FIG. 10 is a block diagram of a second brightness control system in accordance with the invention.

Referring to FIG. 10, there is shown a second embodiment 200 in accordance with the invention. In this second embodiment, the size of the waveform memory 100* is cut in half by using the grayscale mirroring technique described above. Only (bw-1) bits of the video data 95 output by the image memory 94 are used as address inputs for the modified waveform memory 100*. The remaining one bit of the video data 95 is supplied to an exclusive-OR gate 202 to selectively perform a binary complement operation on the output 103* of memory 100* thereby to produce the complementary brightness-setting waveforms not stored in modified memory 100*. A second exclusive-OR gate 204 receives a reverse video command bit 205 from a host system (not shown) to perform a second selective complementing operation on the output of the waveform memory 100*.

Figure 11:
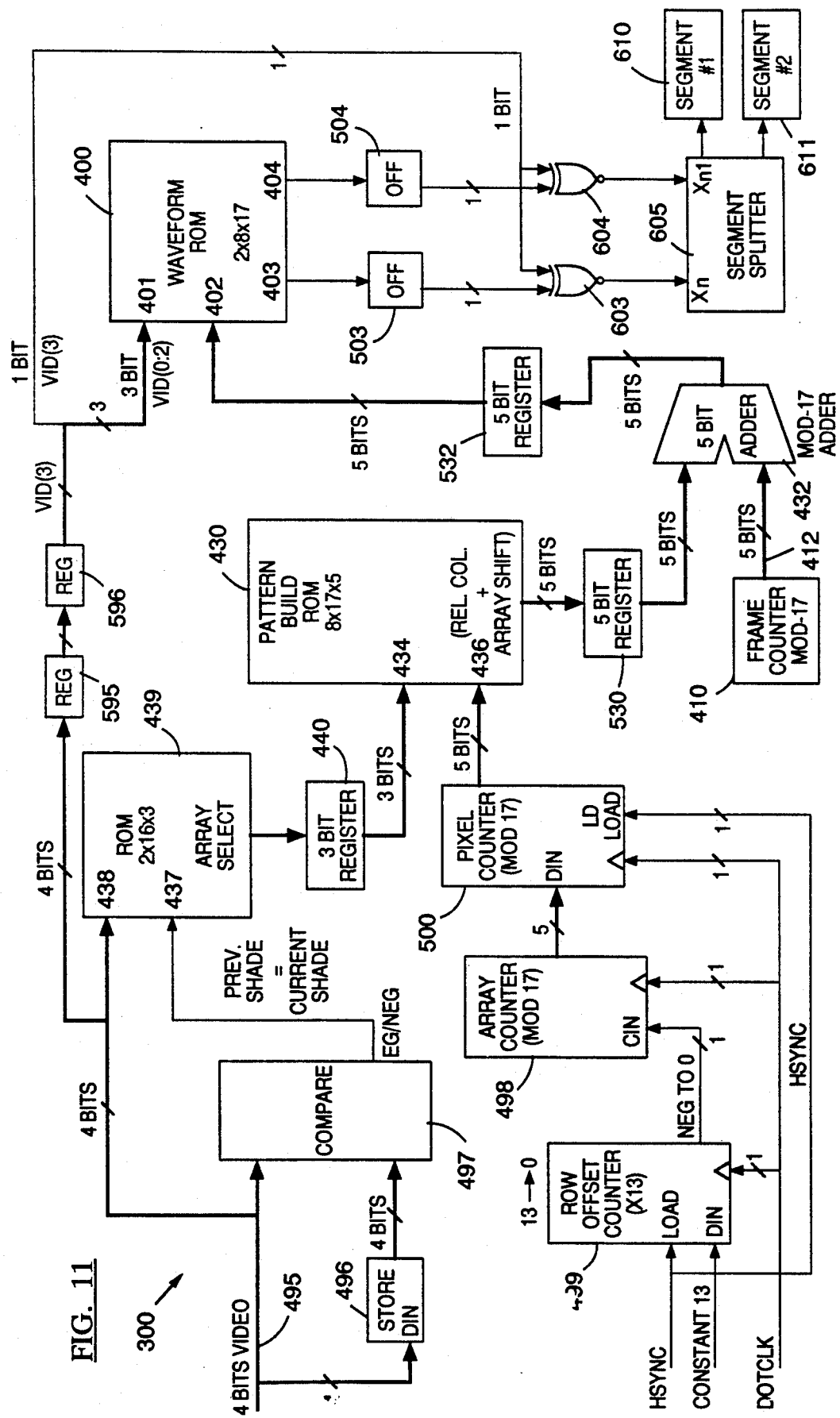
FIG. 11 is a schematic diagram of a brightness control system in accordance with the invention.

Referring to FIG. 11, there is shown a schematic diagram of a circuit 300 in accordance with the invention. Waveform ROM (Read Only Memory) 400 corresponds to the waveform memory 100* of FIG. 10 with the exception that it outputs two streams of command bits, 403 and 404. Output stream 403 corresponds to the output stream of port 103 in FIG. 10. Output stream 404 is a look-ahead version of the output stream 403 and is used in systems which have multiple display segments for enabling smooth meshing (transition) of operation when an image stream is to be broken up and displayed on multiple display segments.

Frame counter 410 corresponds to the frame counter 110 of the previous figures, except that the frame number 412 output thereby is supplied to a modulo-17 adding unit 432 rather than directly into a look-up table means such as the previously described phase-placement memory 130.

Phase-placement pattern-building ROM 430 has the previously described pattern-building arrays formed therein. A relative column count plus wrap-around array shift number is received at address input 436 of ROM 430. Referring back, to the previously described Table 2, it will be noted that for many brightness-setting levels, the same wrap-around sequence is repeated. Only eight arrays, each seventeen bits long, are needed to represent the information of Table 2. Accordingly, phase-placement pattern building ROM 430 has a three bit wide address input 434 for selecting one of these prestored wraparound arrays. A starting point within the selected wrap-around array is determined by a start number 501 which is loaded into modulo-17 pixel counter 500.

Array-selecting ROM 439 has appropriate information stored therein for selecting the suitable one of the eight wraparound arrays stored in pattern-building ROM 430. Address input port 438 of array-selecting ROM 439 corresponds to the brightness-information receiving port 138 of the previous figures. As explained with respect to Table 2 above, it was found that dynamic switching between two different types of patterns improved picture quality. Array-selecting ROM 439 has an additional address input port 437 for receiving informatior indicating whether the brightness level of the previously displayed pixel is equal to or not equal to the brightness level of the next to be displayed pixel. An appropriate wraparound array stored in the pattern-building ROM 430 is selected accordingly. A time-delaying register 440 is included in the path between the output of the array-selecting ROM 439 and the pattern-building ROM 430 to provide a proper matching of timing between the arrival of information at port 434 and port 436 of the pattern-building ROM 430.

Four-bit wide video data 495 is presented to a time delay unit 496 which stores the brightness level of the previous pixel and also to a comparison unit 497 which performs a comparison operation between the brightness level of the current pixel and the brightness level stored in unit 496 thereby to produce the equal/not equal signal 437 which is coupled to array-selecting ROM 439.

The relative column number received at input port 436 of the pattern-building ROM 430 is not a true modulo-D version of the actual column count but is rather slightly altered to account for the previously described modulo-D addition of the value (D-jb−1) value which is added to the last phase number of a first row in a phase-placement pattern in order to convert to the first value in the next subsequent row. Array counter 498 is incremented through a modulo-D count by the dot clock but every time a H-synch pulse is received by offset counter 499, the offset counter 499 sends thirteen additional incrementing pulses to array counter 498 to bump that counter into alignment with the next row of a display. This bumped count 501 of column counter 498 is then loaded into pixel counter 500 when the next H-synch pulse is received. The column counter 498 and offset counter 499 operate as a means for anticipating the next value required when a new row is to be accessed. Pixel counter 500 begins counting from the bumped value (starting value) 501 that is loaded into it from column counter 498 and thereafter continues performing a modulo-D count in step with the dot clock.

A number of delay units, 530, 532, 503, 504, 595 and 596, each providing a delay equal to one dot clock, are provided at the outputs of respective units 430, 432, 400 (output ports 403 and 404) and video data receiving bus 495 for assuring that information arrives at the proper time in each of the subsequent units. Exclusive-OR gates 603 and 604, which are coupled to the outputs of delay units 503 and 504, provide the grayscale mirroring function previously described with respect to exclusive-OR gate 202. The outputs, $X_n$ and $X_{nl}$ of exclusive-OR gates 603 and 604 are supplied to a display driving unit (segment splitter) 605 which is designed for breaking up an image stream among multiple display panels, 610 and 611, and simultaneously refreshing those display panels at a predetermined refresh rate using the supplied bit stream signals $X_n$ and $X_{nl}$. The two bit streams $X_n$ and $X_{nl}$ provide a current command bit and a look-ahead command bit for enabling smooth meshing of image data from one display segment to a second display segment.

In accordance with another aspect of the invention, a dithering (stippling) technique is used to increase the number of brightness levels perceived from the output of the previously described brightness controlling systems. The perceived brightness level of a square display area having the dimensions of two pixels in the column direction by two pixels in the row direction, is altered by commanding horizontally adjacent pixels of this 2×2 display area to different brightness levels, Bx and By, as illustrated below in Table 4 and diagonally adjacent pixels to the same one of the brightness levels, Bx and By.

TABLE 4

GRAYSCALE STIPPLING PATTERNS
Relative Column Number ————>
Bx By
By Bx

| Stipple Pattern | Gray Shade No. | "weighted" sum of the four pixels |
|---|---|---|
| B0 B0<br>B0 B0 | 1 | 0 |
| B0 B1<br>B1 B0 | 2 | 2 |
| B1 B1<br>B1 B1 | 3 | 4 |
| B1 B2<br>B2 B1 | 4 | 6 |
| B2 B2<br>B2 B2 | 5 | 8 |
| B2 B3<br>B3 B2 | 6 | 10 |
| . | | |
| . | | |
| B14 B15<br>B15 B14 | 30 | 58 |
| B15 B15<br>B15 B15 | 31 | 60 |

As seen from the above Table 4, although there might be only sixteen brightness levels, B0-B15, provided by a seventeen-by-seventeen system in accordance with the invention, a total of thirty-two gray shades may be obtained by using the above dithering pattern. Reversal of the order of the brightness levels Bx BY in the horizontal direction at each alternate row that is displayed, helps to prevent the appearance of vertical gray streaks on the display.

It will of course be appreciated, that numerous variations to the above described invention will become apparent to those skilled in the art once the principles and spirit of the invention are appreciated. Dimensions other than D=17 or D=5 may be used for the above described systems depending on the number of brightness levels desired and the speed at which a display unit responds. While the invention has been described in the context of particular application to liquid crystal display panels, its principles are applicable to other types of digitally commanded displays. The above described methods, systems and patterns are intended to be merely exemplary of the invention and should not be taken in a limiting sense. The following claims should be referred to for determining the scope of the claimed invention.

We claim:

1. A method for producing the perception of images having four or more levels of distinguishable brightness on a digitally controlled display, comprising:

defining a set of brightness-setting waveforms each consisting of a number, D, of ON/OFF command bits, the number D satisfying the relationship $$D = na - 1$$

$$D = mb - 1$$

$$a \neq b$$

where a, b, n, m and D are integers greater than zero, the integration of each of said D brightness-setting waveforms producing a different average brightness level over an integration period equal to D bit times;

defining a first square phase-placement matrix of dimensions D cells by D cells;

filling the cells of the phase-placement matrix with at least four different non-consecutive phase shifting values wherein for each brightness-setting waveform there are D possible phases, each phase corresponding to a different bit of the brightness setting waveform; and each cell of the phase-placement matrix corresponding to a pixel in a matrix of D pixels by D pixels in the digitally controlled display; and producing two or more brightness-setting signals having waveforms corresponding to two or more of the brightness-setting waveforms, the produced signals being applied to pixels of the matrix of pixels and shifted in accordance with different non-consecutive phase shifting values in the corresponding cells of the phase-placement matrix.

2. The method of claim 1 wherein the value D further satisfies the relationship $$D = i^2 + 1$$

where i is a value greater than one.

3. The method of claim 2, further including the step of selecting the numbers "a" and "b" to satisfy the relationship $$D = a^2 + b^2.$$

where "a" is not evenly divisible into D, and "b" is not evenly divisible into D, when $a > 1$.

4. The method of claim 1 wherein at least two matrix cells of the phase-placement matrix contain identical phase shifting values, and wherein matrix cells containing identical values are spaced apart from one another by at least one matrix cell not containing an identical value.

5. The method of claim 4, wherein the images being produced are formed of a series of pixels, each having a designated brightness level, further including the steps of defining a second square phase-placement matrix of dimensions D cells by D cells;

filling the cells of the alternative phase-placement matrix with an alternative pattern of phase shifting values; and comparing a level of brightness to be produced at a next-to-be-displayed pixel to a level of brightness produced at a previously-displayed pixel;

using the first phase-placement matrix with the next-to-be-displayed pixel when the desired levels of brightness of the next-to-be-displayed and the previously-displayed pixels are equal; and using the second phase-placement matrix when the desired levels of brightness of the next-to-be-displayed and the previously-displayed pixels are unequal.

6. The method of claim 1, wherein the images being produced are formed of a series of pixels, each having a designated brightness level, and further wherein the number, D, of ON/OFF command bits of the brightness-setting waveform is defined by the relationship $D = A^2 + B^2$, A and B are integers, $A \neq B$, and $A^2 + B^2 + 1$ possible brightness-setting waveforms are defined, and further including the steps of discarding a brightness-setting waveform corresponding to a brightness level substantially equal to but not identical to the minimum brightness level available from the $A^2 + B^2 + 1$ brightness-setting waveforms; and selecting from the remaining brightness-setting waveforms for controlling the series of pixels.

7. The method of claim 6, further including the steps of discarding a brightness-setting waveform corresponding to a brightness level substantially equal to but not identical to the maximum brightness level available from the $A^2 + B^2 + 1$ brightness-setting waveforms; and selecting from the remaining brightness-setting waveforms for controlling the series of pixels.

8. A stippling method comprising the steps of:

defining a plurality of different brightness levels, each being relatively uniformly spaced in brightness level from the other;

defining a square display area of at lest four pixels;

commanding diagonally adjacent pairs of the pixels to a first brightness level; and commanding horizontally adjacent pixels to different brightness levels, wherein the different brightness level selected is the next brightness level of the plurality of brightness levels which is above or below the first brightness level; and further wherein the pixels are commanded to the first or different brightness levels by way of brightness setting waveforms, each having the same number of bits.

9. The method of claim 8, wherein the pixels are commanded to be at least six different brightness levels.

10. The method of claim 8, wherein the pixels are commanded to be at least sixteen different brightness levels.

11. A system for controlling a digitally commanded display unit having pixels arranged in rows and columns to produce, over a number of consecutive frames, the perception of an image having one or more levels of brightness which are selectable from a plurality of levels of brightness, comprising:

row addressing means for designating the row number of a desired pixel;

column addressing means for designating the column number of the desired pixel;

image memory means responsive to the row and column numbers for the desired pixel for producing brightness data indicating a desired level of brightness to be produced at the desired pixel;

waveform memory means for storing a predetermined set of brightness-setting waveforms, wherein each of the waveforms has a predetermined number of bits and produces a different brightness level when applied to a pixel, one bit per frame, over a number of consecutive frames, and for selecting one of the stored brightness-setting waveforms in response to the brightness data, the waveform memory means including bit position selecting means for selecting a designated bit from the selected brightness-setting waveform and outputting said selected bit as a display command bit for use by the display unit to control the state of the desired pixel during a particular frame being displayed by the display unit; and phase-placement patterning means, responsive to the row and column numbers for the desired pixel, to the brightness data, and to the particular frame being displayed, for storing a set of predetermined phase-placement patterns and for designating to the waveform memory means, in accordance with a phase-placement pattern which is selected in response to the brightness data, the bit of the selected brightness-setting waveform to be output by the waveform memory means for the desired pixel and the particular frame being displayed, wherein each of the phase-placement patterns is associated with a different brightness level and a corresponding brightness-setting waveform, and each pattern designates different non-consecutive phase from pixel to pixel with which its corresponding brightness-setting waveform is to be applied to the pixels of the display unit, so that for a particular frame and a particular pixel, the phase-placement pattern means designates a bit of the selected brightness-setting waveform which is to be output.

12. The system according to claim 11 wherein the phase-placement patterns are squares of dimensions D pixels by D pixels; the dimension D being selected in accordance with the relations $D = na - 1$ $D = mb - 1$ $a \neq b$ where a, b, n, m and D are integers greater than zero.

13. The system of claim 12 wherein the dimensions D satisfies the relationship $D = i^2 + 1$ where i is an integer greater than one.

14. The system of claim 12 wherein dimension D is a prime member.

15. The system of claim 11 wherein the phase-placement patterning means has a first set of predetermined phase-placement patterns and a second set of predetermined phase-placement patterns different from the first set, and further including means responsive to brightness data from the image memory means for comparing a desired level of brightness to be produced at a next-to-be-displayed pixel to a desired level of brightness produced at a previously-displayed pixel, and for controlling the phase-placement patterning means to use the first set of phase-placement patterns with the next-to-be-displayed pixel when the desired levels of brightness of the next-to-be-displayed and the previously-displayed pixels are equal, and to use the second set of phase-placement patterns when the desired levels of brightness of the next-to-be-displayed and the previously-displayed pixels are unequal.

16. The system of claim 12 wherein D equals 17.

17. The system of claim 11 wherein the phase-placement patterns comprise a matrix of P rows and Q columns, wherein each row of the matrix includes a wrap-around sequence which designates a different non-consecutive phase from pixel to pixel with which a corresponding brightness waveform is to be applied to the pixels of the display unit; and further wherein the wrap-around sequence in each row is shifted in position by a predetermined number of pixels from one row to the next, with any portion of the wrap-around sequence which extends beyond the end of a row being wrapped around to the beginning of the row.

18. The system of claim 17, wherein P equals Q and the predetermined number of pixels by which the wrap-around sequence is offset within each row, from one row to the next, is three (3) or greater.

19. The system of claim 18 wherein P equals Q, and Q equals 17, the wrap-around sequence is 17 pixels long, each brightness-setting waveform is 17 bits long, and the war-around sequence is offset by four pixels from one row to the next in each phase-placement pattern.

20. The system of claim 11 wherein the bits of the brightness-setting waveform command a pixel to be OFF or to be ON, and further wherein, in each waveform, the bits which command a pixel to be ON are positioned, and the phases of the brightness-setting waveforms designated by the phase-placement patterns to be applied from pixel to pixel are selected, so that the pixels which are ON in the frame are substantially uniformly distributed in the rows and columns of the display unit.

21. The system of claim 19 wherein the bits of the brightness-setting waveform command a pixel to be OFF or to be ON, and further wherein, in each waveform, the bits which command a pixel to be ON are positioned, and the phase from pixel to pixel designated by the phase-placement patterns to be applied from pixel to pixel are selected, so that the pixels which are ON in the frame are substantially uniformly distributed in the rows and columns of the display unit.

22. The system of claim 11, wherein each brightness-setting waveform in the set of brightness-setting waveforms has N bits, where $N = A^2 + B^2$, A and B are integers, $A \neq B$, and $A^2 + B^2 + 1$ possible brightness-setting waveforms are defined, and further wherein a brightness-setting waveform is discarded which corresponds to a brightness level substantially equal to but not identical to the minimum brightness level available from the $A^2 + B^2 + 1$ brightness-setting waveforms, and the remaining brightness-setting waveforms are used for controlling the pixels of the display unit.

23. The system of claim 22, further wherein a brightness-setting waveform is discarded which corresponds to a brightness level substantially equal to but not identical to the maximum brightness level available from the $A^2 + B^2 + 1$ brightness-setting waveforms, and the remaining brightness-setting waveforms are used for controlling the pixels of the display unit.

24. A method for controlling a digitally commanded display unit having pixels arranged in rows and columns to produce over a number of consecutive frames the perception of an image having a number of levels of brightness greater than six, comprising the steps of:

a. defining an irregular rectangle of A pixels in height and B pixels in length, where A and B are integers, and $A \neq B$, $A^2 + B^2 > 6$;

b. defining a set of brightness-setting waveforms having a number of bits equal in number to the sum $N = A^2 B^2$, wherein each brightness-setting waveform produces a different level of brightness when applied to a pixel over a period of N frames;

c. defining a set of wrap-around sequences of N pixels in length, wherein each wrap-around sequence corresponds to a different brightness-setting waveform, and each wrap-around sequence designates a different non-consecutive phase from pixel to pixel with which a corresponding brightness waveform is to be applied to the pixels of the display unit;

defining a first set of phase-placement patterns each pattern of which is associated with a different brightness level and a corresponding brightness-setting waveform, and each such pattern being constructed of a wrap-around sequence corresponding to the different brightness level, wherein in each phase-placement pattern the corresponding wrap-around sequence is used in each row, but offset every A-rows by B-pixels; and e. applying the brightness-setting waveforms to the pixels of the display unit by utilizing the phase-placement patterns to define the non-consecutive phase from pixel to pixel with which the brightness-setting waveforms are applied to the pixels of the display unit.

25. The method of claim 24 wherein the brightness-setting waveforms have bit states of one or zero, and the distribution of the bit states within each brightness-setting waveform and the non-consecutive phases of the brightness-setting waveforms designated in the phase-placement patterns, are selected to substantially uniformly distribute the bits having a state of one over the rows and columns of each frame displayed by the display unit.

26. The method of claim 25, wherein $A^2+B^2+1$ possible brightness-setting waveforms are defined, the method further including the step of f. discarding a brightness-setting waveform corresponding to a brightness level substantially equal to but not identical to the minimum brightness level available from the $A^2+B^2+1$ brightness-setting waveforms, and g. selecting from the remaining brightness-setting waveforms for controlling the pixels of the display unit.

27. The method of claim 26, further including the steps of g. discarding a brightness-setting waveform corresponding to a brightness level substantially equal to but not identical to the maximum brightness level available from the $A^2+B^2+1$ brightness-setting waveforms, and i. selecting from the remaining brightness-setting waveforms for controlling the pixels of the display unit.

28. The method of claim 25, including the steps of selecting A equal to 1 and B equal to 4, to provide brightness-setting waveforms 17 bits in length, and 18 possible brightness-setting waveforms.

29. The method of claim 24 wherein the step "e." further includes the steps of defining a second set of phase-placement patterns different from the first set;

k. comparing a level of brightness to be produced at a next-to-be-displayed pixel to a level of brightness produced at a previously-displayed pixel;

l. using the first set of phase-placement patterns with the next-to-be-displayed pixel when the desired levels of brightness of the next-to-be-displayed and the previously-displayed pixels are equal; and m. using the second set of phase-placement placement patterns with the next-to-be displayed pixel when the desired levels of brightness of the next-to-be-displayed and the previously-displayed pixels are unequal.

30. The apparatus of claim 25, wherein $A^2+B^2+1$ possible brightness-setting waveforms are defined, and further wherein a brightness-setting waveform is discarded which corresponds to a brightness level substantially equal to but not identical to the minimum brightness level available from the $A^2+B^2+1$ brightness-setting waveforms, and the remaining brightness-setting waveforms are used for controlling the pixels of the display unit.

31. The apparatus of claim 30, further wherein a brightness-setting waveform is discarded which corresponds to a brightness level substantially equal to but not identical to the maximum brightness level available from the $A^2+B^2+1$ brightness-setting waveforms, and the remaining brightness-setting waveforms are used for controlling the pixels of the display unit.

32. A method for controlling a digitally commanded display unit having pixels arranged in rows and columns to produce over a number of consecutive frames the perception of an image having more than six levels of brightness, comprising the steps of:

a. defining a set of brightness-setting waveforms each having N bits, where $N=A^2B^2$, A and B are integers, $A \neq B$, and wherein each brightness-setting waveform produces a different level of brightness when applied to a pixel of the display unit over a period of N frames, and each bit of brightness-setting waveform represents a different phase of the waveform;

b. applying the brightness-setting waveforms to pixels of the display unit in accordance with a set of warp-around sequences, wherein each wrap-around sequence controls the application of a corresponding brightness-setting waveform to pixels of the display unit in groups of N consecutive pixels located in a predetermined block of pixels, so that in each group of N consecutive pixels a different non-consecutive phases of the brightness-setting waveform is applied to each pixel from one pixel to the next, and the location of a group of N consecutive pixels in a particular row is controlled to be offset by B-pixels from the relative location of a group of N consecutive pixels A-rows away.

33. The method of claim 32 wherein step "a." further includes the step of selecting A and B so that an irregular rectangle is defined of A pixels in height and B pixels in length.

34. The method of claim 33 wherein step "b." further includes the step of d. sizing the predetermined block of pixels to be N pixels in length and N rows in height.

35. The method of claim 33 wherein step "b." further includes the step of d. defining a set of phase-placement patterns, each pattern of which is associated with a different brightness level and a corresponding brightness-setting waveform, wherein each phase-placement pattern is constructed of a wrap-around sequence; and e. applying the brightness-setting waveforms to the pixels of the display unit in accordance with the set of phase-placement patterns.

36. The method of claim 35 wherein step "e." further includes the step of g. defining a first set of predetermined phase-placement patterns and a second set of predetermined phase-placement patterns different from the first set, and h. comparing a level of brightness to be produced at a next-to-be-displayed pixel to a level of brightness produced at a previously-displayed pixel;

i. using the first set of phase-placement patterns with the next-to-be-displayed pixel when the desired levels of brightness of the next-to-be-displayed and the previously-displayed pixels are equal; and j. using the second set of phase-placement patterns when the desired levels of brightness of the next-to-be-displayed and the previously-displayed pixels are unequal.

37. The method of claim 32, wherein 18 levels of brightness are provided and step "a." includes the step of setting A equal to one and B equal to 4.

38. The method of claim 32, wherein the brightness-setting waveform of N bits defines $A^2+B^2+1$ possible brightness-setting waveforms, the method further including the steps of g. discarding a brightness-setting waveform corresponding to a brightness level substantially equal to but not identical to the minimum brightness level available from the $A^2+B^2+1$ brightness-setting waveforms, and h. selecting from the remaining brightness-setting waveforms for controlling the pixels of the display unit.

39. The method of claim 38, further including the steps of i. discarding a brightness-setting waveform corresponding to a brightness level substantially equal to but not identical to the maximum brightness level available from the $A^2+B^2+1$ brightness-setting waveforms, and j. selecting from the remaining brightness-setting waveforms for controlling the pixels of the display unit.

40. An apparatus for controlling a digitally commanded display unit having pixels arranged in rows and columns to produce over a number of consecutive frames the perception of an image having more than six levels of brightness, comprising:

means for defining a set of brightness-setting waveforms each having N bits, where $N=A^2B^2$, A and B are integers, $A \neq B$, and wherein each brightness-setting waveform produces a different level of brightness when applied to a pixel of the display unit over a period of N frames, and each bit of brightness-setting waveform represents a different phase of the waveform;

means for applying the brightness-setting waveforms to pixels of the display unit in accordance with a set of warp-around sequences, wherein each wrap-around sequence controls the application of a corresponding brightness-setting waveform to pixels of the display unit in groups of N consecutive pixels located in a predetermined block of pixels, so that in each group of N consecutive pixels a different non-consecutive phases of the brightness-setting waveform is applied to each pixel from one pixel to the next, and the location of a group of N consecutive pixels in a particular row is controlled to be offset by B-pixels from the relative location of a group of N consecutive pixels A-rows away.

41. The apparatus of claim 40 wherein the defining means A and B are selected so that an irregular rectangle is defined of A pixels in height and B pixels in length.

42. The apparatus of claim 41 wherein the predetermined block of pixels in the applying means is sized to be N pixels in length and N rows in height.

43. The apparatus of claim 42 wherein the applying means further includes means for defining a set of phase-placement patterns, each pattern of which is associated with a different brightness level and a corresponding brightness-setting waveform, wherein each phase-placement pattern is constructed of a wrap-around sequence; and means for applying the brightness-setting waveforms to the pixels of the display unit in accordance with the set of phase-placement patterns.

44. The apparatus of claim 40 wherein 18 levels of brightness are provided and A equals one and B equals 4.

45. The apparatus of claim 43 wherein the phase-placement patterning means has a first set of predetermined phase-placement patterns and a second set of predetermined phase-placement patterns different from the firsts set, and further including means for comparing a level of brightness to be produced at a next-to-be-displayed pixel to a level of brightness produced at a previously-displayed pixel, and for controlling the defining means to use the first set of phase-placement patterns with the next-to-be-displayed pixel when the desired levels of brightness of the next-to-be-displayed and the previously-displayed pixels are equal, and to use the second set of phase-placement patterns when the desired levels of brightness of the next-to-be-displayed and the previously-displayed pixels are unequal.

* * * * *